(12) United States Patent
Uchiyama

(10) Patent No.: US 6,377,751 B1
(45) Date of Patent: Apr. 23, 2002

(54) WATERPROOF TYPE LENS-EQUIPPED FILM UNIT AND METHOD OF ASSEMBLING THE SAME

(75) Inventor: Keiji Uchiyama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/674,980

(22) PCT Filed: Feb. 22, 2000

(86) PCT No.: PCT/JP00/00996

§ 371 Date: Dec. 28, 2000

§ 102(e) Date: Dec. 28, 2000

(87) PCT Pub. No.: WO00/57244

PCT Pub. Date: Sep. 28, 2000

(30) Foreign Application Priority Data

Mar. 19, 1999  (JP) ............................................. 11-076069
Mar. 19, 1999  (JP) ............................................. 11-076071
Mar. 19, 1999  (JP) ............................................. 11-076072
Mar. 25, 1999  (JP) ............................................. 11-080787

(51) Int. Cl.⁷ .............................................. G03B 17/08
(52) U.S. Cl. ............................ 396/25; 396/29; 396/543
(58) Field of Search ........................ 396/25, 543, 29, 396/535, 6, 387; 200/341, 302.2, 345

(56) References Cited

U.S. PATENT DOCUMENTS

| | | | |
|---|---|---|---|
| RE29,047 E | * 11/1976 | Brindley | .................. 240/10.66 |
| 4,170,104 A | * 10/1979 | Yamagata | .................. 58/23 R |
| 5,107,288 A | * 4/1992 | Kakita et al. | .................. 396/24 |
| 5,298,928 A | * 3/1994 | Suzuki et al. | .................. 396/26 |
| 5,602,604 A | * 2/1997 | SanGregory | .................. 396/25 |
| 5,784,652 A | * 7/1998 | Schroder et al. | ................ 396/6 |
| 5,897,225 A | * 4/1999 | Rieger et al. | ................. 396/29 |
| 5,930,545 A | * 7/1999 | Petruchik et al. | ........... 396/542 |
| 5,970,261 A | * 10/1999 | Ishiguro et al. | ................ 396/85 |
| 6,088,531 A | * 7/2000 | Endoh | ......................... 396/29 |

FOREIGN PATENT DOCUMENTS

| | | |
|---|---|---|
| JP | 5-248448 | 9/1993 |
| JP | 6-82894 | 3/1994 |
| JP | 6-82897 | 3/1994 |
| JP | 7-168265 | 7/1995 |
| JP | 9-5939 | 1/1997 |
| JP | 9-185101 | 7/1997 |
| JP | 11-224557 | 8/1999 |

* cited by examiner

*Primary Examiner*—David M. Gray
(74) *Attorney, Agent, or Firm*—Young & Thompson

(57) ABSTRACT

A waterproof camera includes a camera body having an actuation member that actuates an internal mechanism when pressed. A waterproof case is arranged to contain the camera body in a watertight fashion, with an opening arranged to face the actuation member and a stepped portion around the opening on an inside wall of the waterproof case. A resilient operation member having a button portion exposed to the outside through the opening has a mounting portion which fits on the stepped portion around the opening. The operation member can be resiliently deformed to press the actuation member when the button portion is depressed. A supporting member pushes the mounting portion against the stepped portion from inside the waterproof case, so as to secure the operation member. In one embodiment, the supporting member is fixed on the camera body.

5 Claims, 20 Drawing Sheets

WATERPROOF TYPE LENS-EQUIPPED FILM UNIT AND METHOD OF ASSEMBLING THE SAME

FIELD OF THE ART

The present invention relates to a waterproof lens-fitted photo film unit that contains a body of the lens-fitted photo film unit in a watertight waterproof case to permit photographing in the water, and relates also to an assembling method therefor. More specifically, the present invention relates to a waterproof lens-fitted photo film unit that is superior in waterproof properties and handing properties, saves manufacturing cost, prevents mishandling thereof and prevents defective joints in the waterproof case, and also relates to an assembling method therefor.

BACKGROUND ARTS

Lens-fitted photo film units, which are preloaded with a photo filmstrip and provided with simple photographic mechanisms, are widely used in the world because of its handiness. There are a variety of lens-fitted photo film units for use in different photographic purposes and applications. For example, there are a flash type that allows photography even in the night, and a non-flash type which is simplified by minimizing functions to essential ones. There is also a waterproof lens-fitted photo film unit that permits photography in the water as a body of the lens-fitted photo film unit, hereinafter referred to as the film unit body, is contained in a waterproof case that has a watertight structure.

Of the waterproof lens-fitted photo film unit, operation members are provided on the waterproof case, such that actuation members may be operated from outside the waterproof case, wherein the actuation members are provided in the film unit body for actuating a flash device, a shutter mechanism or the like. These operation members of the waterproof type are made comparatively larger than actuation members, such as a shutter button, of other types of lens-fitted photo film units, or they are protruded from external surfaces of the waterproof case, so that the operation members may be operated without fail even in the water or when the photographer wares thick gloves.

An example of these operation members is an operation button made of rubber, as disclosed in Japanese Patent Application No. 9-347754. This operation button is attached to the waterproof case by force-fitting a portion of the button into a hole that is formed in the waterproof case, from outside the waterproof case, and can be pressed for operation because of its resiliency. In this way, waterproof property is obtained. Because being supported by the external surface of the waterproof case, this operation button is proof against the pressing operation from outside to inside, pressures from water and the like.

As the operation button is formed as an integral part from rubber, it is superior in water-tightness, and also reduces the number of parts and the cost for manufacturing and assembling the waterproof case. However, since the operation button is mounted from the outside, it is easy to remove, so the case is likely to loose its water-tightness. Where the operation button is protruded outward from the waterproof case, it can be pressed unexpectedly while the lens-fitted photo film unit is carried in a bag, or in other situations like that.

The lens-fitted photo film unit contains a photo film cartridge with its unexposed photo filmstrip previously pulled out from a cartridge shell and coiled into a roll. A winding knob that is coupled to a spool of the cartridge shell is rotated after each exposure, to wind up the photo filmstrip by each exposed frame into the cartridge shell. A shutter mechanism is designed to be charged in cooperation with the winding knob being rotated for winding up one frame. For this purpose, the film unit body is provided with a stop-winding mechanism for locking the winding knob from rotating when one frame of the photo filmstrip has been wound up into the cartridge shell. The stop-winding mechanism cooperates with the movement of the photo filmstrip, and includes a stop lever. The stop lever is brought into engagement with teeth that are formed around an external periphery of the winding knob when the winding knob is rotated in a winding direction by an amount corresponding to one frame. Besides, an anti-reverse claw is provided on the film unit body. The anti-reverse claw is engaged with the teeth around the winding knob, for preventing the winding knob from being rotated in reverse to the winding direction.

In the waterproof lens-fitted photo film unit, a winding dial is provided on the waterproof case, and is engaged with the winding knob of the film unit body. The winding dial is made larger in diameter than the winding knob, thereby to obtain a larger rotational torque, and thus improve handling properties thereof, as it is operated in the water or with gloved hands. For this reason, the anti-reverse claw provided for the winding knob is too weak to securely prevent reverse rotation of the winding dial.

Japanese Laid-open Patent Application No. 5-248448 discloses a teaching to provide a torque limiter between the winding knob of the film unit body and the winding dial on the waterproof case, such that the torque limiter does not transmit rotational force from the winding dial to the winding knob if the winding dial is rotated while a load is applied to the winding knob or while the winding knob is locked. Because of this torque limiter, if the winding dial is rotated in the winding direction or in the reverse direction while the winding knob is locked, the winding dial idles, and the winding knob does not rotate.

However, because the torque limiter as above allows the winding dial to rotate endlessly, if the user does not know much about this type of waterproof lens-fitted photo film unit, the user might not notice that the winding knob is being rotated reversely, and could not take photographs.

The film unit body is generally constituted of a body base portion in which the photo filmstrip is loaded and the photographic mechanisms, including the shutter mechanism, are incorporated, and front and rear covers that covers front and rear sides of the body basic portion. These parts are modified according to the type of the lens-fitted photo film unit. For instance, the body base portion for the flash type is provided with a mounting portion for a flash unit that is constituted of a capacitor, a battery, a circuit board and so forth. The front cover for the flash type is provided with a flash opening for exposing a flash projector. On the other hand, in the non-flash type, the flash unit mounting portion and the opening for the flash projector are not provided, thereby to eliminate useless spaces and useless parts.

In order to use specific parts for the respective types of lens-fitted photo film unit, metal molds are needed for forming the specific parts of the respective types. This has been one of causes of raising manufacturing cost of the lens-fitted photo film unit. As for the waterproof lens-fitted photo film unit, not only the film unit body but also the waterproof case need to be modified depending upon whether it is with flash or without flash, so the increase in the manufacturing cost is more remarkable.

When assembling the waterproof lens-fitted photo film unit, it is conventional to mount the operation members to the waterproof case water-tightly before inserting the film unit body in the waterproof case and joining a pair of members that constitute the waterproof case to each other in a watertight fashion.

However, when the pair of case members are water-tightly joined to each other after the operation members are mounted water-tightly, air cannot get out of the waterproof case, and is confined in the waterproof case in a compressed condition, so the air pressure inside the waterproof case gets higher. As a result, a load is applied to joints between the case members, and sometimes breaks or loosens the joints, so the case looses its water-tightness. For the same reason, defective products with incompletely joined case members are likely to be manufactured.

The present invention is made to solve the above problems, and has an object to provide a waterproof camera or a waterproof lens-fitted photo film unit with an operation button that is proof against the pressing operation and water pressure, and is not easy to remove. The present invention also has an object to provide a device for preventing the operation button from being wrongly operated.

Another object of the present invention is to provide a waterproof lens-fitted photo film unit that makes it possible to carry out film winding operation without fail while preventing reverse rotation of the winding dial.

A further object of the present invention is to make it possible to manufacture a non-flash type waterproof lens-fitted photo film unit at a low cost.

Still another object of the present invention is to provide a waterproof lens-fitted photo film unit that can be assembled efficiently in a watertight fashion, while preventing breakage and defects in joints between case members, and an assembling method therefor.

DISCLOSURE OF THE INVENTION

A waterproof camera of the present invention is characterized by comprising a camera body having an actuation member that actuates an internal mechanism when the actuation member is pressed; a waterproof case that contains the camera body in a watertight fashion, the waterproof case being provided with an opening in a position facing the actuation member and a stepped portion around the opening on an inside wall of the waterproof case; an operation member having a button portion exposed to outside through the opening and a mounting portion fitted on the stepped portion, the operation member being formed as an integral part from a resilient material and resiliently deformed to press the actuation member when the button portion is pushed in; and a supporting member that pushes the mounting portion against the stepped portion from inside of the waterproof case, thereby to secure the operation member. The waterproof camera of the present invention includes a waterproof lens-fitted photo film unit that is preloaded with a photo filmstrip while it is manufactured. The above camera body includes a film unit body.

Because the operation button is constituted of the button portion and the mounting portion, and the button portion is fitted in the opening of the waterproof case from inside and is exposed to the outside of the waterproof case, whereas the mounting portion is force-fitted in the stepped portion that is formed around the opening on the inner wall of the waterproof case, and also because the operation member is secured by pressing the mounting portion against the inner wall of the waterproof case by means of the supporting member, the operation member is proof against the pressing operation and the water pressure, and is uneasy to remove from outside the waterproof case. Forming the supporting member integrally on the outer surface of the camera body contributes to reducing the number of parts and the number of assembling processes, and also provides a stable support. By making the button portion protrude out of the waterproof case, and forming an outward protrusion on the edge of the opening to surround the button portion at least partly, the operation member is prevented from being pressed unexpectedly.

According to another aspect of the present invention, in a waterproof lens-fitted photo film unit that comprises a film unit body having a photo filmstrip preloaded therein and a waterproof case that contains the film unit body in a watertight fashion, wherein the film unit body is provided with a taking lens, photographic mechanisms, a winding knob rotated for winding up the photo filmstrip after each exposure of one frame, a stop-winding mechanism for locking the winding knob when the photo filmstrip has been wound up by one frame, and an anti-reverse device for preventing the winding knob from rotating in a direction reverse to a film winding direction, whereas a winding operation member for rotating the winding knob from outside of the waterproof case is pivotally mounted on the waterproof case, the waterproof lens-fitted photo film unit is characterized by comprising a torque limiter that normally couples the winding operation member to the winding knob, and releases the winding operation member from the winding knob when the winding operation member is rotated while the winding knob is locked by the stop-winding mechanism, or when the winding operation member is rotated in the reverse direction; and a second anti-reverse device for stopping the winding operation device from rotating in the reverse direction.

Even if the winding operation member is operated to rotate in the reverse direction, the second anti-reverse device stops the winding operation member from rotating reversely, so the user will notice that the winding operation member is being rotated reversely. If the winding operation member is rotated while the winding knob is locked by the stop-winding mechanism, the torque limiter disengages the winding operation member from the winding knob, so the winding operation member idles, and the stop-winding mechanism or the photo filmstrip would not be broken. Even if the winding operation member is forcibly rotated in the reverse direction to break the second anti-reverse device, because the anti-reverse device for the winding knob applies a load on the winding knob when the winding operation member is being further rotated reversely, the torque limiter releases the engagement between the winding operation member and the winding knob, so the winding operation member idles. In this way, the winding knob is securely prevented from being rotated reversely.

According to a further aspect of the present invention, in a waterproof lens-fitted photo film unit comprising a non-flash type film unit body that does not have a flash device mounted therein, and a waterproof case that is at least partly transparent and contains the film unit body in a watertight fashion such that the film unit body may be operated from outside the waterproof case, wherein the film unit body comprises a body base portion containing a photo filmstrip and having a taking lens and photographic mechanisms mounted therein, and front and rear covers covering the body base portion from front and rear sides thereof, the waterproof lens-fitted photo film unit is characterized in that the body base portion and the front cover are designed for a flash-type film unit body that is to have a flash device mounted therein, and the front cover is formed with a flash opening for exposing a light projecting portion of the flash device; and that a shielding device for shielding sight of the flash opening from outside the waterproof case is provided.

According to a method of the present invention for assembling a waterproof lens-fitted photo film unit, wherein a non-flash type film unit body having no flash device mounted therein is contained water-tightly in an at least partly transparent waterproof case such that the film unit body may be operated from outside the waterproof case, a taking lens and photographic mechanisms are mounted to a body base portion that is provided with a mounting portion for a flash device, without mounting the flash device; a photo filmstrip is loaded in the body base portion; the front of the body base portion is covered with a front cover that has a flash opening for exposing a light projecting portion of the flash device; and a shielding device is provided for shielding sight of the flash opening from outside the waterproof case.

Since the non-flash type film unit body uses the front cover that is formed with the flash opening for exposing the light projecting portion of the flash device, and the shielding device for shielding sight of the flash opening from outside the waterproof case is provided, it becomes possible to use common parts to the flash type unit body, so the non-flash type waterproof lens-fitted photo film unit may be manufactured at a low cost. As the parts that constitute the non-flash type unit body are equal in shape and size to those used for the flash type unit body, it is possible to produce the waterproof case for the non-flash type just by applying a little modification to a flash type waterproof case. Therefore, the cost of manufacture is still more reduced.

According to another assembling method of a waterproof lens-fitted photo film unit of the present invention, the whole film unit body is covered with a pair of case members that constitute a waterproof case, and these case members are joined to each other in a watertight fashion, and thereafter an operation member, such as at least one of those members for operating a shutter mechanism, a film winding mechanism and a flash device, is coupled to the waterproof case in a watertight fashion. When the case members are water-tightly joined together, the air inside the waterproof case escapes through an opening for mounting the operation member, so the air pressure inside the waterproof case is not increased.

By providing at least one of a pair of case members that constitute a waterproof case, with a pressure regulating device for equalizing the internal air pressure inside the waterproof case to atmospheric pressure when said case members are joined to each other, the air pressure inside the waterproof case would not be increased even when the pair of case members are joined together in a watertight fashion after the operation members are water-tightly mounted to designated positions of the pair of case members.

PREFERRED EMBODIMENTS OF THE INVENTION

The present invention will be described in more detail below with reference to the accompanying drawings.

Figure 1:
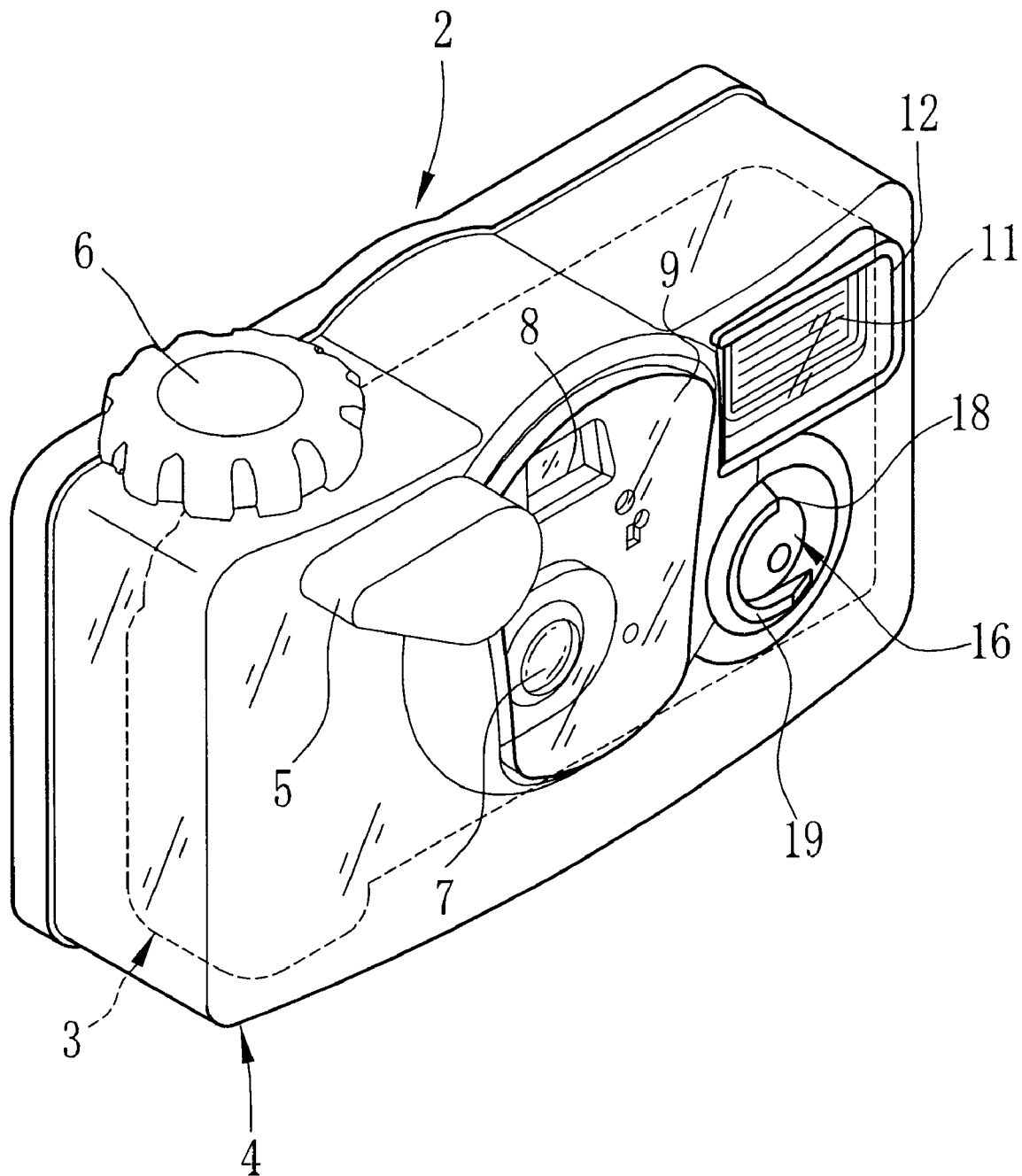
FIG. 1 is a perspective view of a flash type waterproof lens-fitted photo film unit, according to a first embodiment of the present invention.
Figure 2:
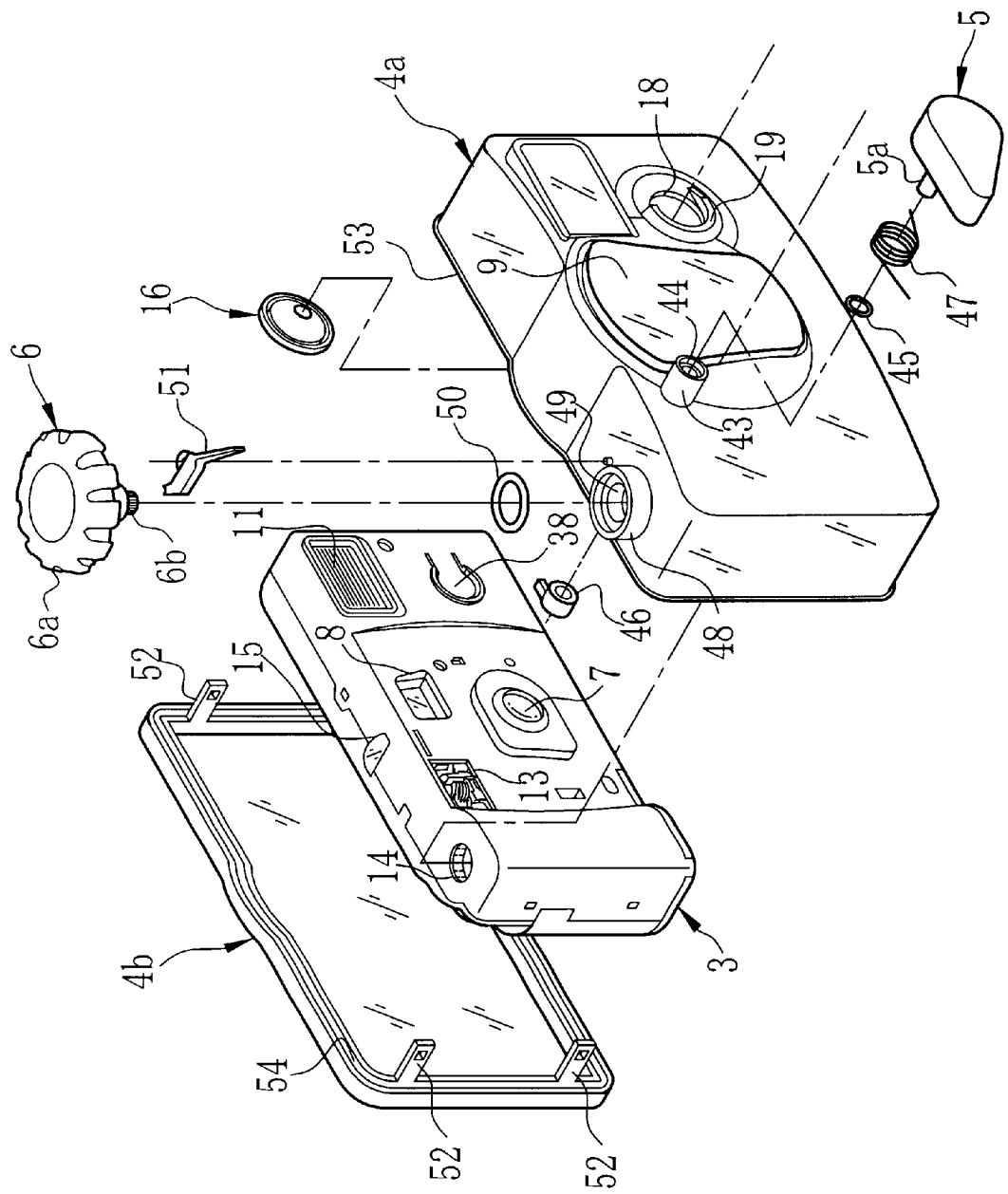
FIG. 2 is an exploded perspective view of a waterproof case of the waterproof lens-fitted photo film unit of FIG. 1.

FIG. 1 is a perspective view illustrating an appearance of a waterproof lens-fitted photo film unit 2 according to a first embodiment of the present invention. The waterproof lens-fitted photo film unit 2 consists of a film unit body 3 and a waterproof case 4 that contains the film unit body 3. As shown in FIG. 2, the waterproof case 4 consists of a front case member 4a that covers front, side, top and bottom surfaces of the film unit body 3, and a rear case member 4b that covers a rear surface of the film unit body 3, and is jointed to the front case member 4a in a watertight fashion. The front and rear case members 4a and 4b are made of transparent plastic.

On outer surfaces of the waterproof case 4 are provided many kinds of operation members so that the film unit body 3 may be operated from outside the waterproof case 4. As these operation members, a winding dial 6 for winding up a photo filmstrip after exposure is mounted on the top side, and a shutter lever 5 for shutter-releasing and a flash operation button 16 for flash-charging are mounted on the front side. The waterproof case 4 is provided with a transparent photographic window portion 9 that covers front of a taking lens 7, a finder objective window 8 and other elements located in a front center portion of the film unit body 3, and also a transparent flash opening portion 12 that covers front of a flash projector 11 of the film unit body 3. A frame counter window 15 is located on the top side of the film unit body 3, for showing the remaining number of frames available for exposure.

In this embodiment, the entire waterproof case 4 is made of transparent plastic, so the contained film unit body 3 and thus the frame counter window 15 and a finder eyepiece window 30 (see FIG. 3) are visible from outside the waterproof case 4. However, the waterproof case 4 does not have to be transparent. It is possible to color the waterproof case 4 or cover the waterproof case 4 with a semi-transparent or opaque waterproof cover, except those portions which must be transparent, such that those facing the frame counter window 15 and the finder eyepiece window 30 of the film unit body 3.

Figure 4:
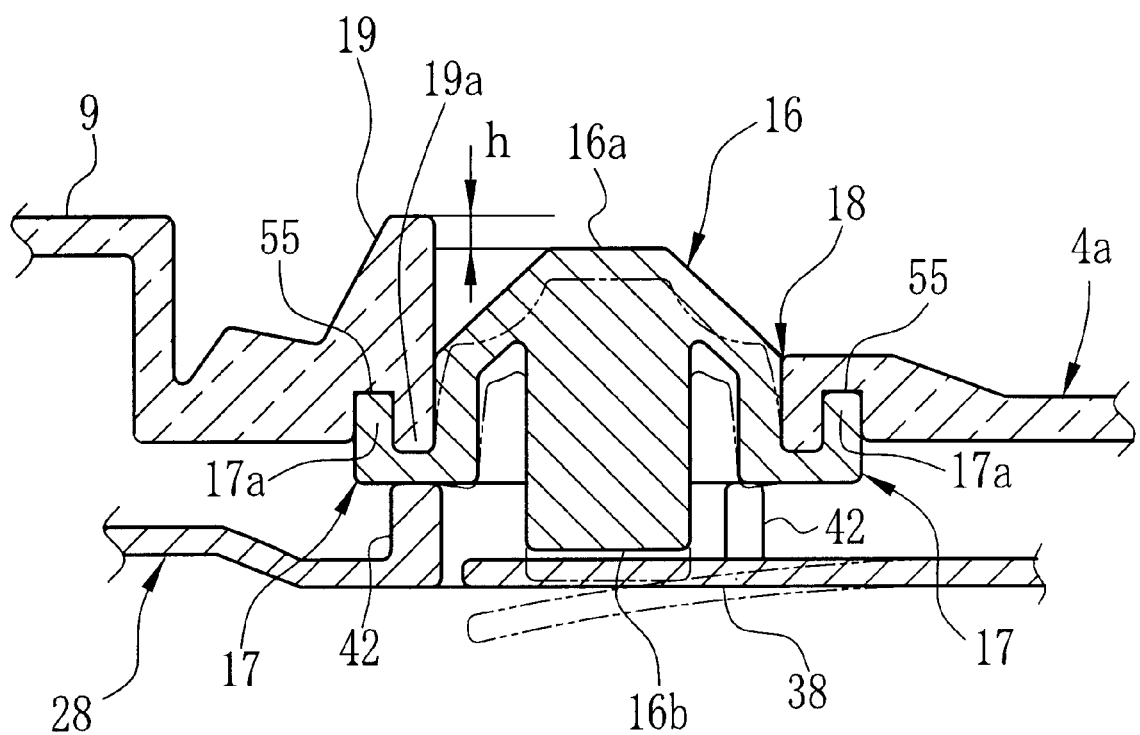
FIG. 4 is a horizontal sectional view of a flash operation button provided on the waterproof case.

As shown in section in FIG. 4, the flash operation button 16 is mounted to the waterproof case 4 from inside thereof, such that a substantially conical button portion 16a protrudes outward through a round opening 18 that is provided through the waterproof case 4. According to this configuration, even when the sensitivity of user's hands is lowered because the user is in the water or wares thick gloves, the button portion 16a is easy to locate and operate. The button portion 16a may be shaped differently from the substantially conical shape. For example, the button portion 16 may be substantially cylindrical or hemispherical. It is also possible to form the opening 18 into a rectangular shape, and use a trapezoid button portion. But forming the opening 18 into a substantially round shape is more preferable because it increases tightness between the operation button 16 and the waterproof case 4, and thus increases water-tightness.

A rib 19 that protrudes outward from the waterproof case 4 is formed along the fringe of the opening 18, to surround the button portion 16a halfway or so. The rib 19 is formed to be higher than a height of the button portion 16a protruding from the outer surface of the waterproof case 4 when the button portion 16a is not pressed (see "h" in FIG. 4). This configuration prevents the flash operation button 16 from being pressed unexpectedly, for example, while the waterproof lens-fitted photo film unit 2 is carried in a bag or the like.

Since the rib 19 is not provided all around the opening 18, it is easy to put the finger on the flash operation button 16 from one side of the waterproof case 4 while gripping the waterproof lens-fitted photo film unit 2 in a posture for photography. Therefore, the rib 19 prevents wrong-operation while maintaining operation facility. Provision of the rib 19 also prevents the finger from entering inside an incident angle of the taking lens 7 during the flash operation, so it prevents a trouble called finger-taking, where an image of the finger of the photographer is unexpectedly contained in the photographed frame.

Figure 3:
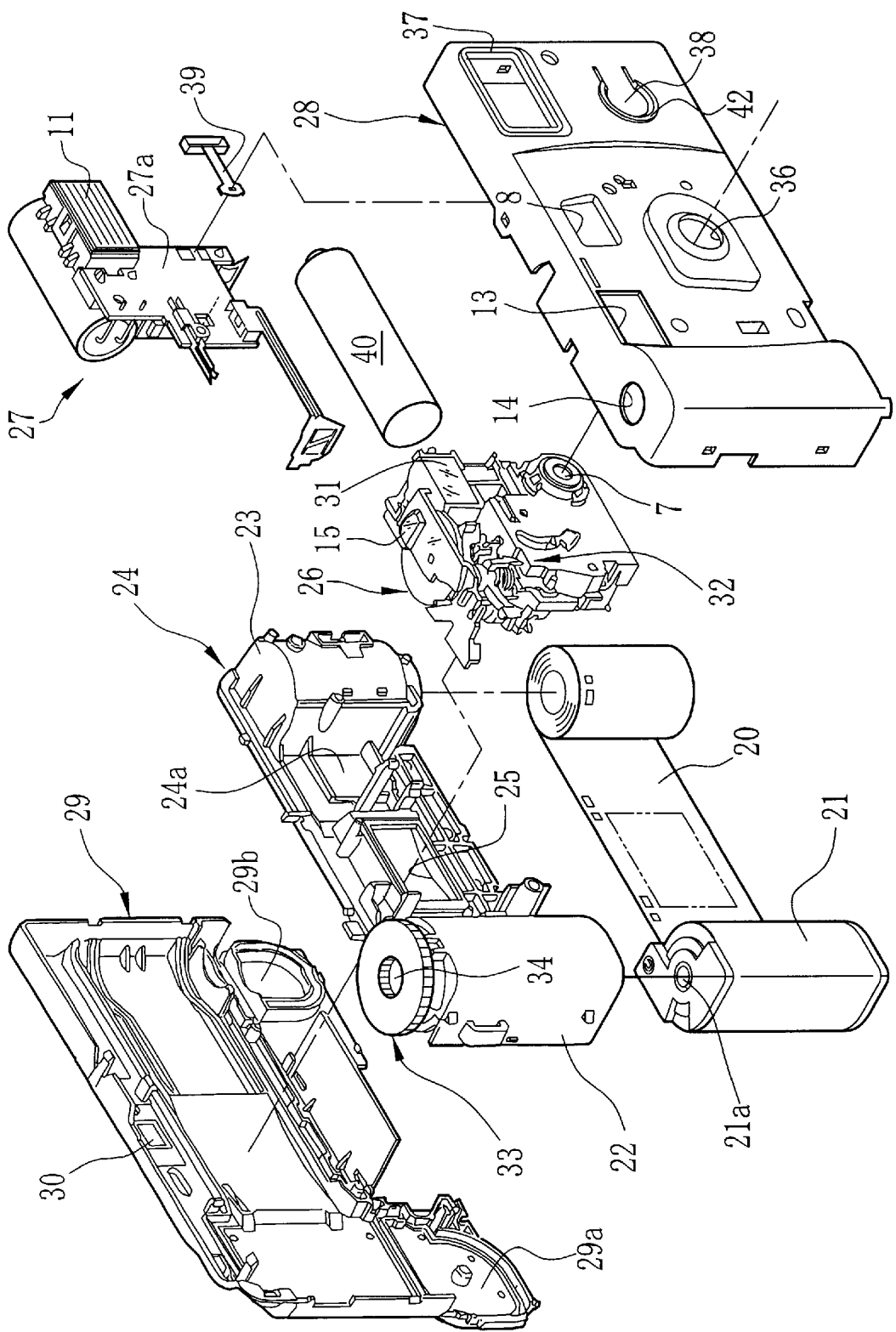
FIG. 3 is an exploded perspective view of a film unit body of the waterproof lens-fitted photo film unit of FIG. 1.

As shown in an exploded condition in FIG. 3, the film unit body 3 is constituted of a body base portion 24 that has a cartridge chamber 22 and a film chamber 23 formed integrally on opposite sides of an exposure aperture 25 for loading a photo film cartridge shell 21 of and a roll of unexposed photo filmstrip 20 respectively, an exposure unit 26 that is mounted to the front of the exposure aperture 25 of the body base portion 24, a flash unit 27 that is mounted in a mounting portion 24a provided between the film chamber 23 and the exposure opening 25, a front cover 28 that covers the front side of the body base portion 24 with these units mounted thereto, and a rear cover 29 that covers the rear side of the body base portion 24 in a light tight fashion. The rear cover 29 is formed with the finder eyepiece window 30 and bottom lids 29a and 29b that close bottoms of the cartridge chamber 22 and the film chamber 23 light-tightly, and allow to open and close repeatedly. The film unit body 3 has a structure that is fundamentally the same as a film unit body of an ordinary lens-fitted photo film unit that does not use the waterproof case 4, so most parts are commonly used, and thus the cost is lowered.

The exposure unit 26 has the taking lens 7, a finder optical system 31, a shutter mechanism 32, a stop-winding mechanism, a frame counter mechanism and so forth mounted therein, which are held by a top plate in which the frame counter window 15 is integrally formed. The flash unit 27 is an assembly in which the flash projector 11 consisting of a discharge tube, a reflector, a diffusion plate and so forth is mounted to a circuit board 27a, and the circuit board 27a has a circuit pattern printed thereon and circuits elements of many kinds, including a main capacitor, mounted thereon. The flash unit 27 is supplied from a battery 40.

On the front side of the front cover 28, there are formed a shutter release opening 13, the finder objective window 8, an opening for the taking lens 36, a flash opening 37, and a flash charge button 38. On the top side of the front cover 28, there are formed a winding dial opening 14 and others. The shutter release opening 13 is for exposing the shutter mechanism 32 to the outside of the film unit body 3. The flash opening 37 is for fitting the flash projector 11 therein. The charge button 38 is a segment that is formed by cutting out a portion of the front cover 28 such that the segment is resiliently bendable.

The charge button 38 constitutes an actuation member for actuating the flash unit 27. Upon the charge button 38 being pressed, a switch contact strip 39 is pressed to short-circuit contacts that are provided on the circuit board 27a, thereby to start flash-charging. The charge button 38 may be pressed through the flash operation button 16 from outside the waterproof case 4. On the fringe of the charge button 38, a supporting rib 42 is formed integrally with the outer surface of the front cover 28. Instead of forming the supporting rib 42 integrally with the front cover 28, the supporting rib 42 may be secured to the front cover 28 by bonding or welding. As set forth later, the supporting rib 42 is a supporting member for supporting the flash operation button 16 from inside the waterproof case 4.

A winding knob 33 is pivotally mounted atop the cartridge chamber 22, and is engaged with a spool 21a of the cartridge shell 21. The winding knob 33 has an engaging hole 34 formed in its top side, and the engaging hole 34 is exposed to the outside of the film unit body 3 through the winding dial opening 14. On the other hand, the front case member 4a has a boss 48 formed on its top side in a position corresponding to the winding dial opening 14, and the winding dial 6 is pivotally held in the boss 48. The winding dial 6 consists of a saucer-like operating portion 6a and a drive shaft 6b formed on a rotary center of the operating portion. The operation portion 6a has knurls formed around its outer periphery. A tip of the drive shaft 6b is put through a hole 49 inside the boss 48, to be protruded into the waterproof case 4 and engaged in the engaging hole 34 of the winding knob 33. According to this configuration, rotating the winding dial 6 in a winding direction (counterclockwise direction in the drawings) causes the winding knob 33 and the spool 21a to rotate to wind the photo filmstrip 20 into the cartridge shell 21. An O-ring 50 is fitted in the boss 48, for shielding water and dusts. An anti-reverse lever 51 for the winding dial 6 is mounted in proximity to the boss 48.

Also a boss 43 is formed on the front side of the front case member 4a, for pivotally bearing a drive shaft 5a of the shutter lever 5. A tip of the drive shaft 5a is inserted into the front case member 4a through a hole 44 inside the boss 43. A release lever 46 is secured to the tip of the drive shaft 5a. The release lever 46 is engaged with the shutter mechanism 32 through the shutter release opening 13. An O-ring 45 is fitted in the boss 43, for the sake of shielding water and dusts, whereas a coiled spring 47 is fitted on the boss 43. The coiled spring 47 urges the shutter lever 5 in the clockwise direction, so the shutter lever 5 is held in an initial position as shown in FIG. 1. By pushing down the shutter lever 5 in the counterclockwise direction, the shutter mechanism is released through the release lever 46. Thereafter, the shutter lever 5 returns to the initial position according to the urging force of the coiled spring 47.

The rear case member 4b of the waterproof case 4 is fastened to the front case member 4a through engagement of engaging arms 52, which are formed on the rear case member 4b, with engaging claws which are not shown but formed on inner walls of the front case member 4a. Simultaneously, a brim 53 around a rear opening of the front case member 4a is water-tightly fitted in an engaging groove 54 that is formed around margins of the rear case member 4b. For improving water-tightness, it is preferable to stop up spacing between the engaging groove 54 and the brim 53 by means of a not-shown gasket, such as a rubber ring.

As shown in FIG. 4, the flash operation button 16 consists of a button portion 16a, a pressing portion 16b provided on a rear end of the button portion 16a, and a mounting portion 17 formed around these portions, which are formed integrally from an elastic watertight material, such as rubber. The charge button 38 is located behind the pressing portion 16b, so the flash operation button 16 is resiliently bent to press the charge button 38 at the pressing portion 16b by pressing the button portion 16a, as shown by phantom lines in FIG. 4.

The mounting portion 17 has a ridge 17a formed around its outer periphery. The ridge 17a is force-fitted in an annular groove 55 that is formed in the inner wall of the front case member 4a, when the flash operation button 16 is fitted in the opening 18 from inside the waterproof case 4. As being mounted by force-fitting the ridge 17a in the annular groove 55 from inside the waterproof case 4, the flash operation button 16 cannot easily be removed, so the waterproof properties are maintained. Furthermore, force-fitting the ridge 17a in the annular groove 55 prevents water and dusts from entering the waterproof case 4 through the opening 18.

Where the film unit body 3 is contained in the waterproof case 4, the supporting rib 42 is located behind the mounting portion 17, and presses the mounting portion 17 against the inside of the waterproof case 4, to secure the flash operation button 16. Accordingly, even though the button portion 16a is pressed from the outside, the mounting portion 17 would not be removed, and the flash operation button 16 would not drop inside the waterproof case 4. For the same reason, the flash operation button 16 acquires a sufficient resistance to water pressure. Since the supporting rib 42 is formed integrally with the front cover 28, it is unnecessary to provide a specific supporting member, so an increase in the cost is restrained. Moreover, the supporting rib 42 acquires a sufficient strength enough for supporting the flash operation button. The supporting rib 42 also supports a rear end 19a of the rib 19 from the rear side through the mounting portion 17. Because the outwardly protruding rib 19 is supported by the supporting rib 42, any load would not be applied to a base portion of the rib 19 even when an external force is applied to the rib 19, so the rib would not easily be broken.

Although the first embodiment has been described so far, the present invention is not limited to this embodiment, but various modifications are possible. For example, indeed the rib 19 protrudes higher than the button portion 16a in the above embodiment, but the rib 19 may be lower than the button portion 16a insofar as it is high enough for preventing the flash operation button 16 from making a stroke that is necessary for turning the charge button 38 on. Other embodiments will be described below while using the same reference numbers for the same members as the above embodiment, so the detailed description of these members will be omitted.

Figure 5:
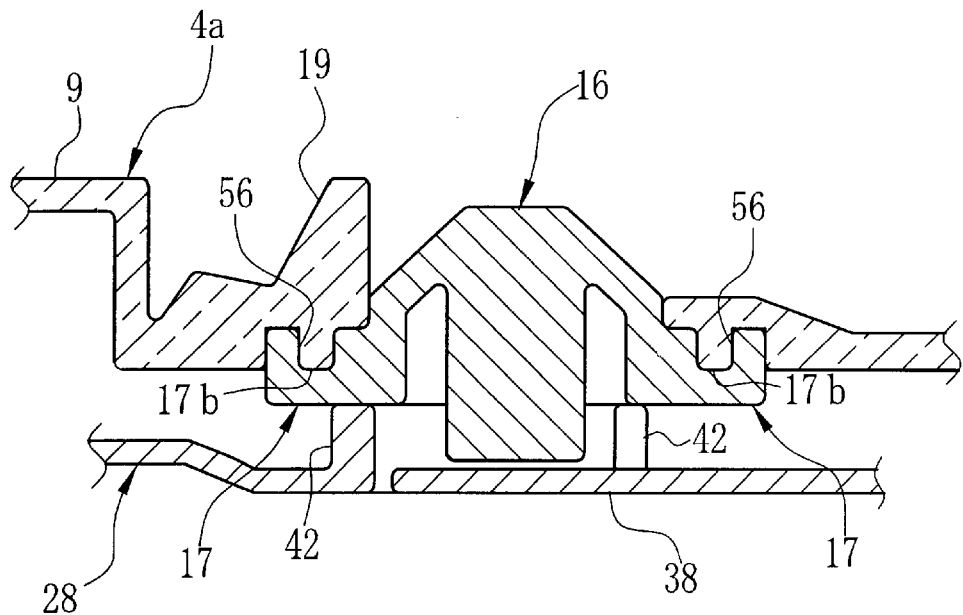
FIG. 5 is a horizontal sectional view of a waterproof case with a flash operation button, according to another embodiment.

As shown in FIG. 5, a flash operation button 16 may be mounted to a waterproof case 4 by providing a recess 17b in a mounting portion 17 and fitting the recess 17b on a protrusion 56 that is formed correspondingly on an inside of the waterproof case 4. Although the supporting member for the flash operation button 16 is constituted of the supporting rib 42 that is formed integrally with the front cover 28 in the above embodiment, it is possible to provide a separate supporting member 57 from a front cover 28, as shown in FIG. 6, for supporting the flash operation button 16.

Figure 6:
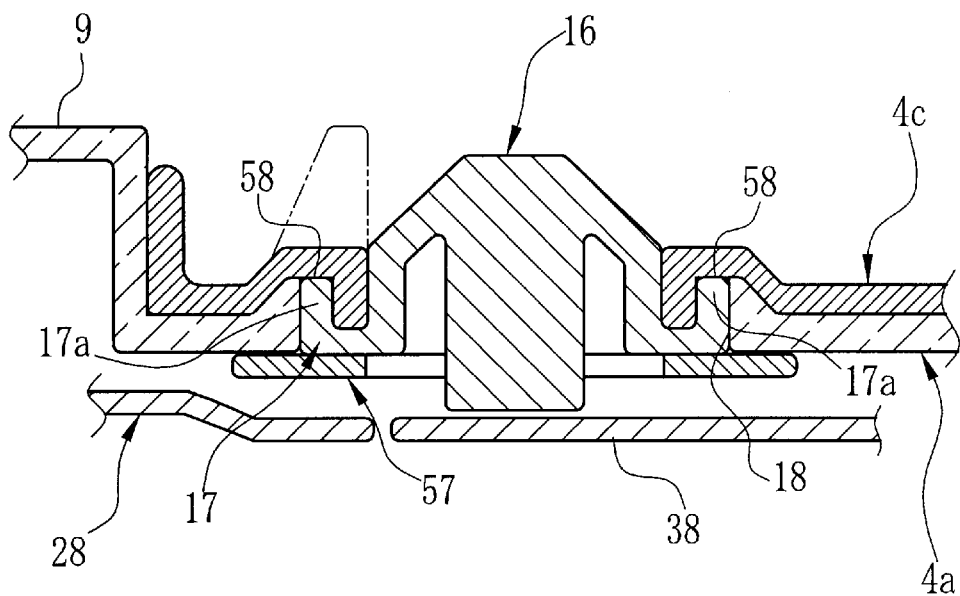
FIG. 6 is a horizontal sectional view of a waterproof case with a flash operation button, according to still another embodiment.

In the example shown in FIG. 6, a waterproof cover 4c made of an elastomer, a polymer with elasticity, is provided on a front of a front case member 4a, wherein an annular groove 58 for force-fitting a mounting portion 17 therein is constituted of a spacing that is formed between the waterproof cover 4c and an opening 18 of the front case member 4a. According to this configuration, it is unnecessary to form the annular groove 55 with the front case member 4a, so the manufacture of the front case member 4a is facilitated. Although the rib 19 for preventing the wrong operation is omitted in this example, it is possible to form a ridge like the rib 19 on the waterproof cover 4c, as shown by phantom lines.

Figure 7:
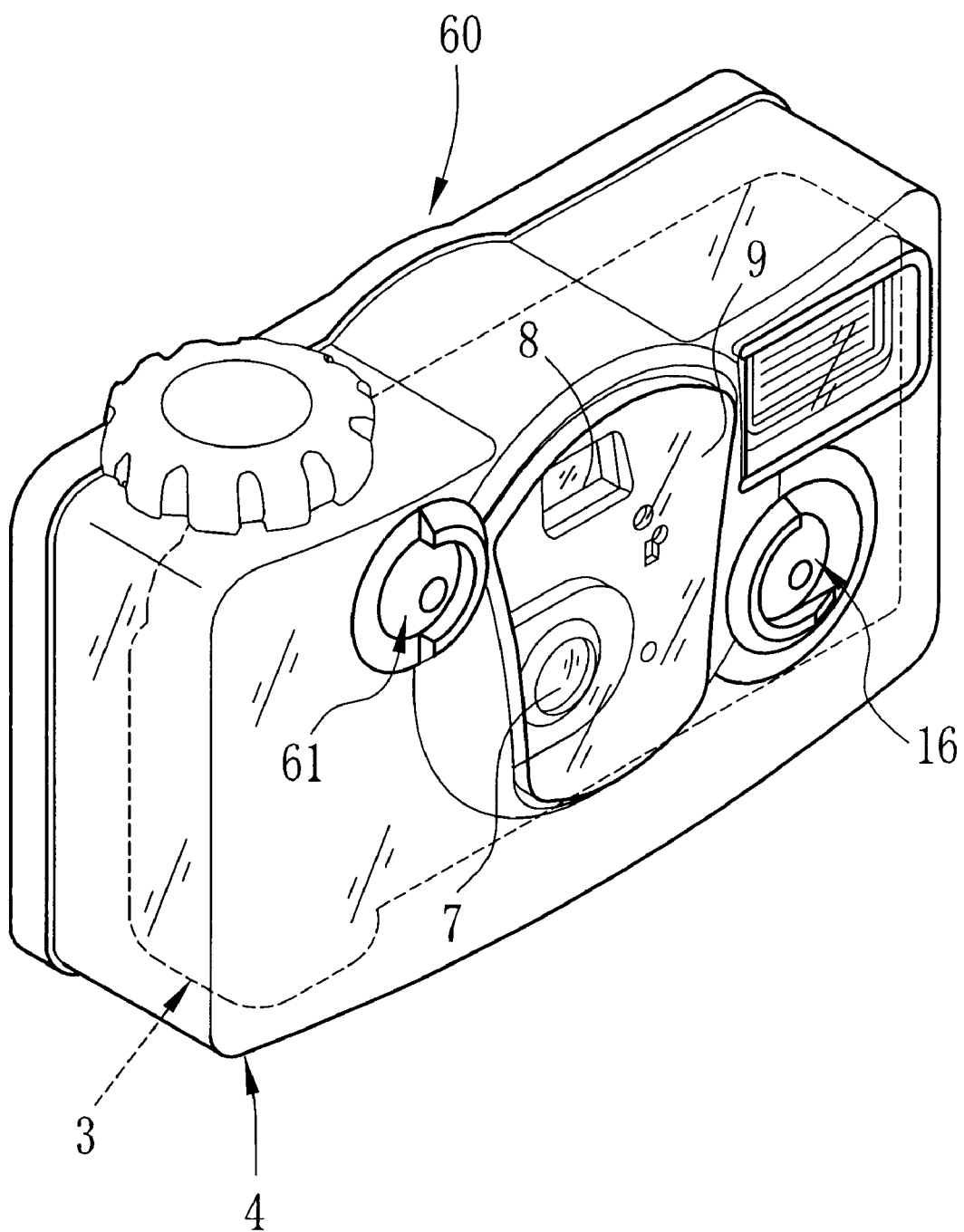
FIG. 7 is a perspective view of a flash type waterproof lens-fitted photo film unit, according to a further embodiment of the present invention.

As shown in FIG. 7, it is also possible to provide a waterproof lens-fitted photo film unit 60 with a shutter operation button 61 that has a similar structure to the flash operation button 16, instead of the shutter lever 5. In this embodiment, a shutter button is provided on a front side of a front cover of a film unit body 3 that is contained in a waterproof case 4. This shutter button is formed by cutting out a portion of the front cover, like the above charge button 38, such that the shutter button actuates a shutter mechanism when it is pressed. As compared to the case where the shutter lever 5 is used, this embodiment contributes to reducing the number of parts and also makes the shutter operation member watertight without the O-ring. Like ordinary cameras, the shutter operation may be done by a familiar pressing operation. It is of course possible to use a film unit body that has a shutter button formed on its top side, and arrange the shutter operation button 61 on the top side of the waterproof lens fitted-photo film unit. In that case, an operation member for rotating the winding knob should be placed at another position on the waterproof case, instead of the winding dial 6. Although the above embodiment refers to a flash type waterproof lens-fitted photo film unit, the above configuration may be preferably applicable to an operation member, e.g. a shutter operation member, of a non-flash type waterproof lens-fitted photo film unit, or to an operation member of a waterproof case of a waterproof camera or the like.

Figure 8:
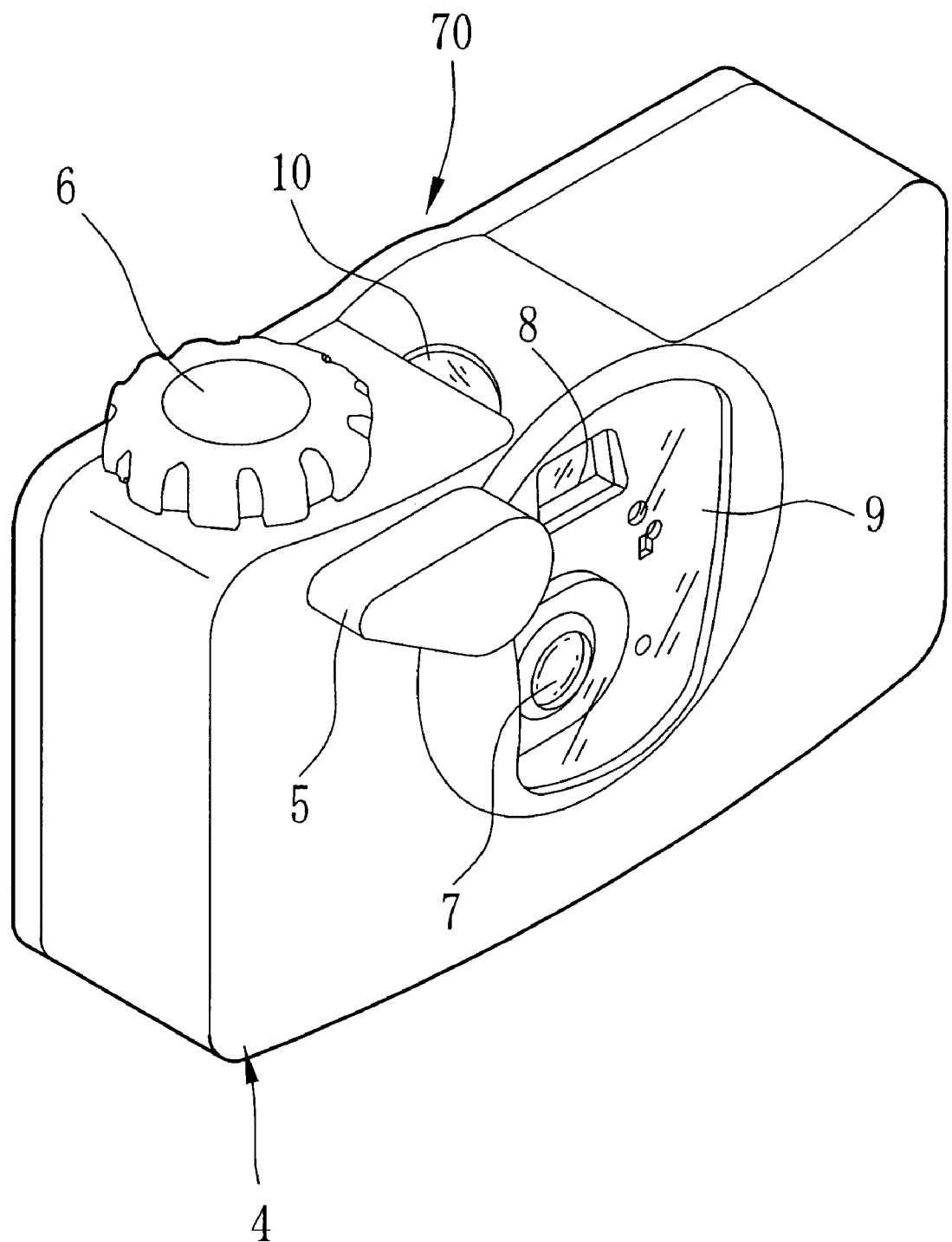
FIG. 8 is a perspective view of a non-flash type waterproof lens-fitted photo film unit, according to another embodiment of the present invention.
Figure 9:
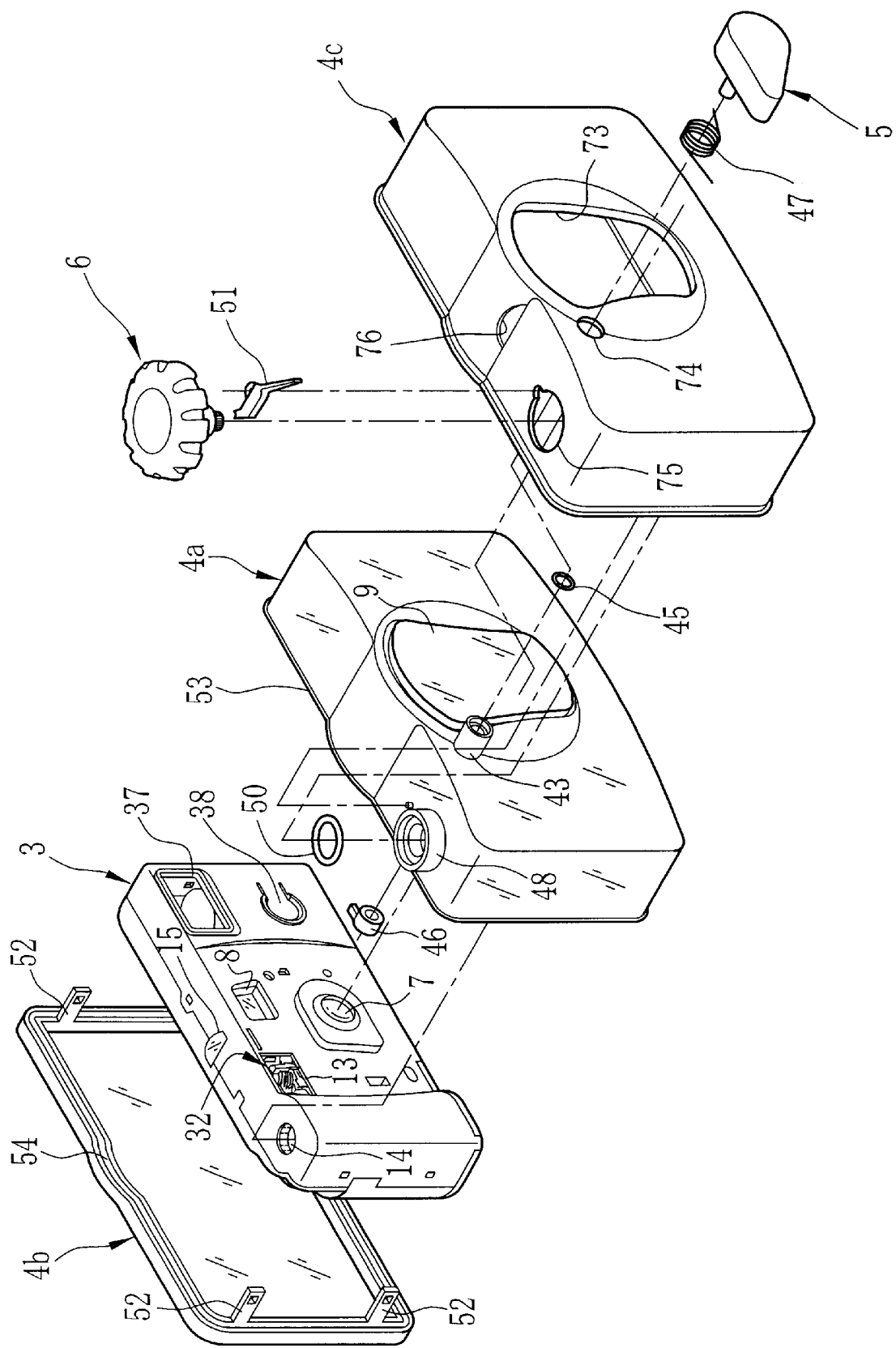
FIG. 9 is an exploded perspective view of a waterproof case of the waterproof lens-fitted photo film unit of FIG. 8.
Figure 10:
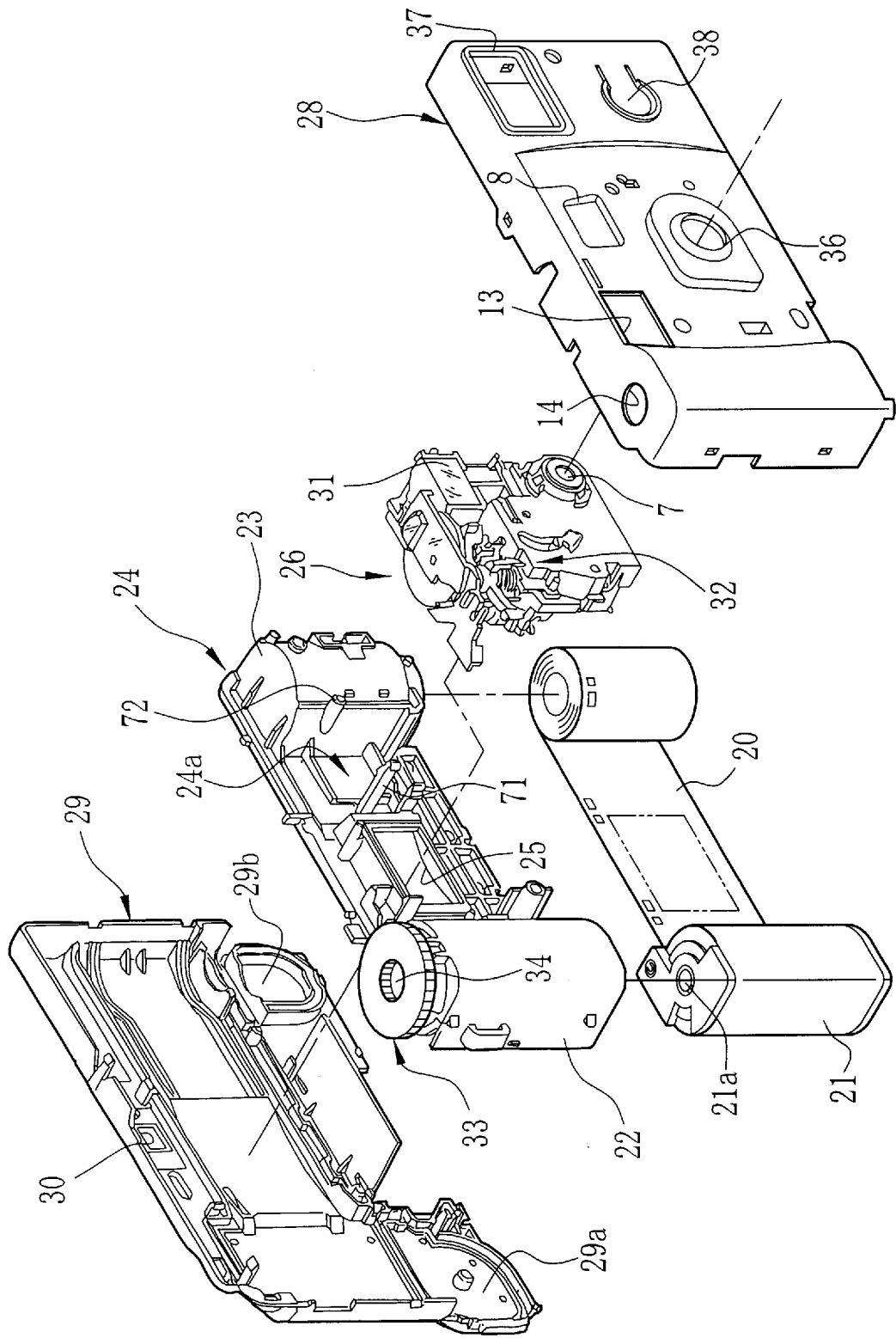
FIG. 10 is an exploded perspective view of a film unit body of the waterproof lens-fitted photo film unit of FIG. 8.

Next, a waterproof lens-fitted photo film unit according to another embodiment of the present invention, as shown in FIG. 8, will be described. The waterproof lens-fitted photo film unit 70 is of a non-flash type that does not have a flash unit mounted therein, but all parts of a film unit body 3, including a body base portion 24, an exposure unit 26, a front cover 28 and a rear cover 29, are the same as used in a flash type film unit body, as shown in FIGS. 9 and 10. In other words, except that the film unit 70 does not have the flash unit, other parts are equal in shape and size to those used in the flash type, so the front cover 28 of the film unit 70 is formed with a flash opening 37 and a charge switch 38. Also a mounting space 24a for the flash unit is provided between an exposure aperture 25 and a film chamber 23 of the body base portion 14. An engaging hook 71, a positioning pin 72 and other members for mounting the flash unit remain in the mounting space 24a.

In the embodiment of FIG. 8, a waterproof case 4 consists of front and rear case members 4a and 4b which are individually formed from a transparent plastic, and a waterproof cover 4c made of an opaque elastomer with elasticity. The waterproof cover 4c has a corresponding shape to the front case member 4a, and is a size larger than the front case member so that the waterproof cover 4c may be fitted tightly on the outside of the front case member 4a. An opening 73 for uncovering a photographic window portion 9 is formed through a front portion of the waterproof cover 4c. An inwardly protruded ridge rims the opening 73. This ridge is force-fitted in a groove that is formed around the photographic window portion 9. Thus, the waterproof cover 4c is fitted on the front case member 4a in a watertight fashion. Openings 74 and 75 are formed through the front side and a top side of the waterproof case 4c respectively for putting bosses 43 and 48 through them. Besides, the waterproof case 4c is formed with an opening 76 in a position facing a frame counter window 15, for forming a look-in window 10. Covering the front case member 4a almost entirely with the elastomer waterproof cover 4c improves the water-tightness and operating characteristics as well, because it makes the waterproof case 4 less slippery. Moreover, because the elastomer has cushioning properties, the waterproof lens-fitted photo film unit 70 is improved in impact resistance. It is to be noted that the waterproof cover 4c and the front case member 4a are not necessarily formed separately, but may be formed as an integral part, for example, by two-color molding.

Since the front case member 4a is covered with the waterproof cover 4c, it comes to be impossible to look inside the waterproof case 4, except through the photographic window portion 9, the look-in window 10 and the rear case member 4b. Accordingly, the flash opening 37 and the charge button 38 becomes invisible from outside the waterproof case 4, so it is impossible to see from outside the waterproof case 4 that the front cover 28 is a part that is commonly used in the flash type.

In the non-flash type waterproof lens-fitted photo film unit 70 configured as above, the respective parts of the film unit body 3, including the body base portion 24, the front cover 28 and the rear cover 29, may be formed by use of the same molds as used for the respective parts of the flash type. Therefore, the cost of manufacture is remarkably reduced.

Figure 11:
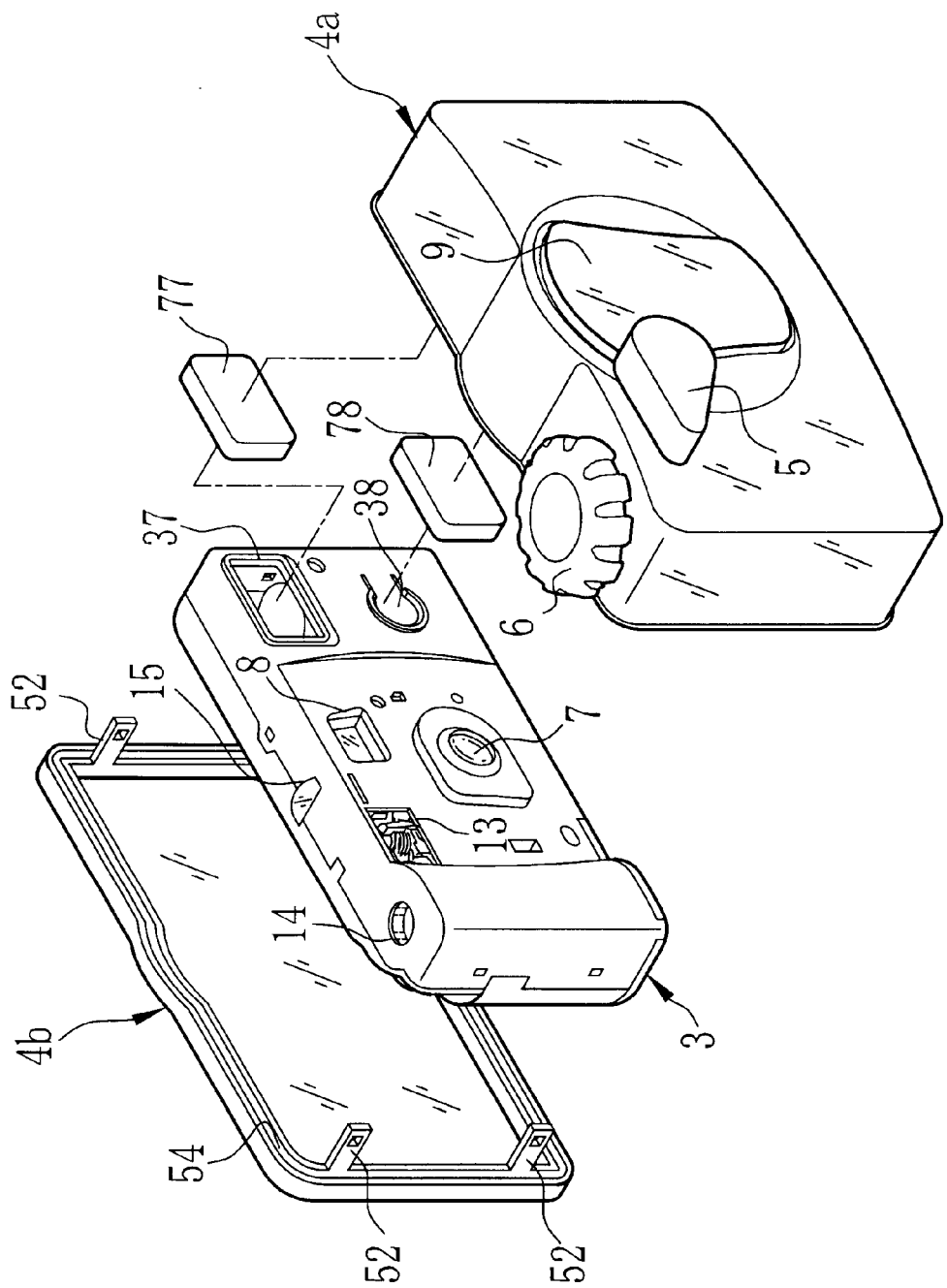
FIG. 11 is a perspective view of a flash type waterproof lens-fitted photo film unit, according to another embodiment of the present invention.

Although the waterproof cover 4c is used as a device for hiding the flash opening 37 and the charge button 38 in the above embodiment, it is possible to use another device for hiding the flash opening 37 and the charge button 38. For example, in an embodiment shown in FIG. 11, sponge chips 77 and 78 of an approximately parallelepiped shape are used for hiding the flash opening 37 and the charge button 38. These sponge chips 77 and 78 are respectively placed in front of the flash opening 37 and the charge button 38, and are held between a front cover 28 and a front case member 4a. In this embodiment, a waterproof cover is not used, so the entire appearance of the film unit body 3 is visible through a waterproof case 4 that contains the film unit body 3. Since the sponge chips 77 and 78 have resiliency, requisite dimensional accuracy is not so high. Therefore, the sponge chips may be manufactured or available at a low cost. Accordingly, the non-flash type lens-fitted photo film unit of this embodiment may be manufactured at a lower cost as compared to the case where the waterproof cover 4c is used as the sight-shielding device.

It is possible to cover the flash opening 37 and the charge button 38 with a single sponge chip. The sponge chip may have a round shape or another shape. The sight-shielding device may not necessarily be made of sponge, but a paper sheet or box may be used for covering an area extending from the flash opening 37 and the charge button 38. This embodiment is preferable in the aspect that it is suitable for recycling and easy to decorate.

Figure 12:
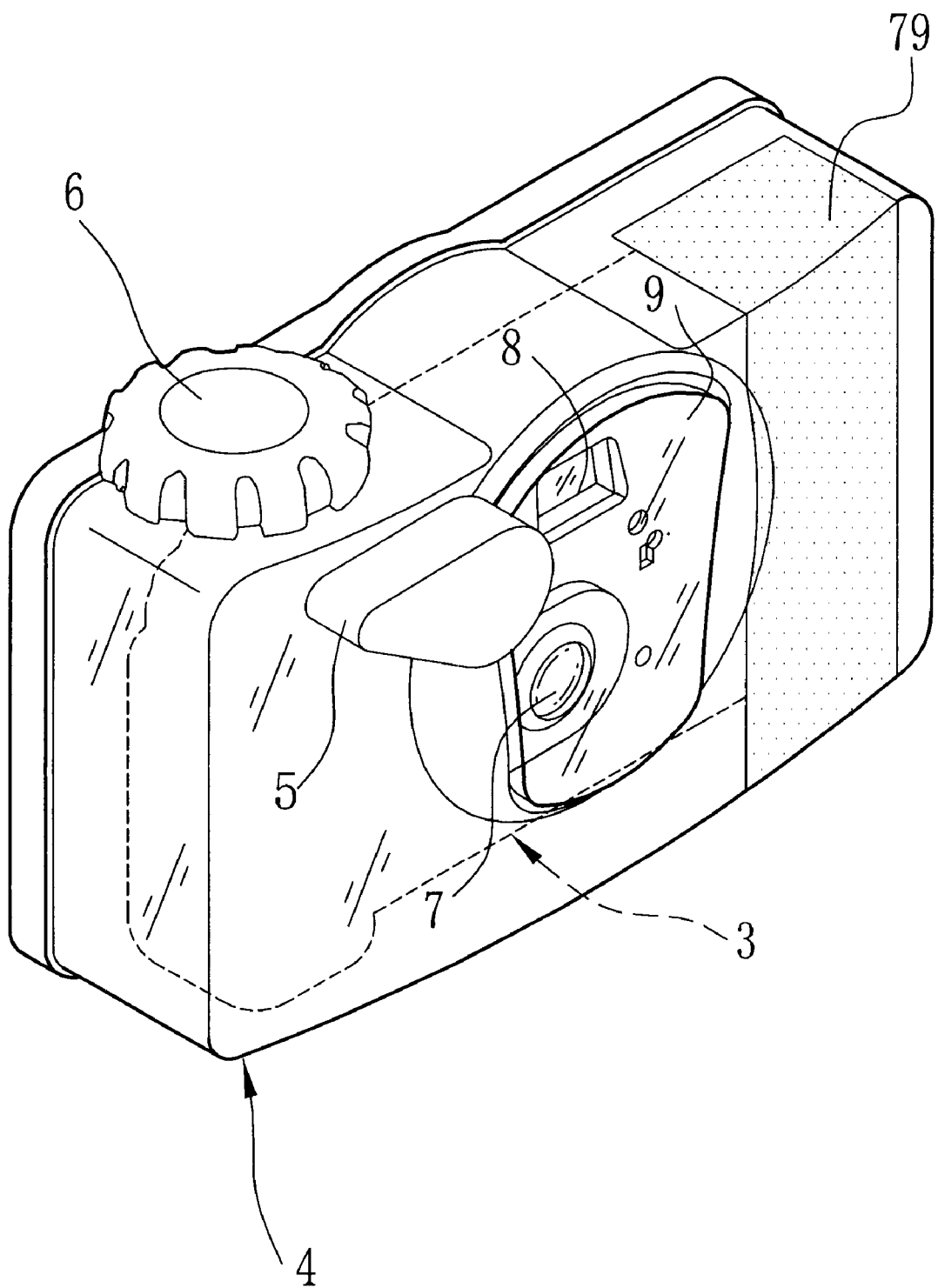
FIG. 12 is a perspective view of a non-flash type waterproof lens-fitted photo film unit, according to another embodiment of the present invention.

In alternative, as shown in FIG. 12, the flash opening 37 may be hidden by putting an adhesive sheet 79 on a waterproof case 4. Since it is only necessary to put the adhesive sheet 79 on the waterproof case 4, the manufacturing process is simplified. It is easy to accent the appearance of the waterproof lens-fitted photo film unit by providing ornamental patterns or logos on the adhesive sheet 79. Although the adhesive sheet 79 partly covers front, top and bottom sides of the waterproof case 4 in the drawings, it is of course possible to cover a side surface of the waterproof case 4. This makes it harder to see the flash opening 37 from the outside. It is also possible to put an adhesive sheet on a film unit body instead of the waterproof case 4. It is alternatively possible to produce a front case member from a semi-transparent or opaque material, and use the front case member itself as a device for hiding the flash opening. In that case, such portions that must be transparent, like the photographic window portion, should be formed as separate parts and assembled into the front case member.

The non-flash type waterproof lens-fitted photo film units having these configurations allow to use the same molds for forming the respective parts of the film unit body 3 as used for the respective parts of the flash type.

In an assembling process of the waterproof lens-fitted photo film units, the formed parts are sorted into an assembling line for the flash type film unit bodies, and an assembling line for the non-flash type waterproof lens-fitted photo film units of the present invention. Since the film unit body of the flash type and the film unit body of the non-flash type are constituted of common parts, it is difficult to distinguish them from each other by their appearance, so there is a risk of confusing them and putting the non-flash type film unit body in the waterproof case for the flash type. By providing separate assembling lines for the respective types, such confusion is surely prevented.

However, because the flash projector 11 is not exposed through the flash opening 37 in the non-flash type film unit body, it is possible to distinguish the non-flash type from the flash type in view of this. Therefore, it may be possible to assemble both types on the same line.

Figure 13:
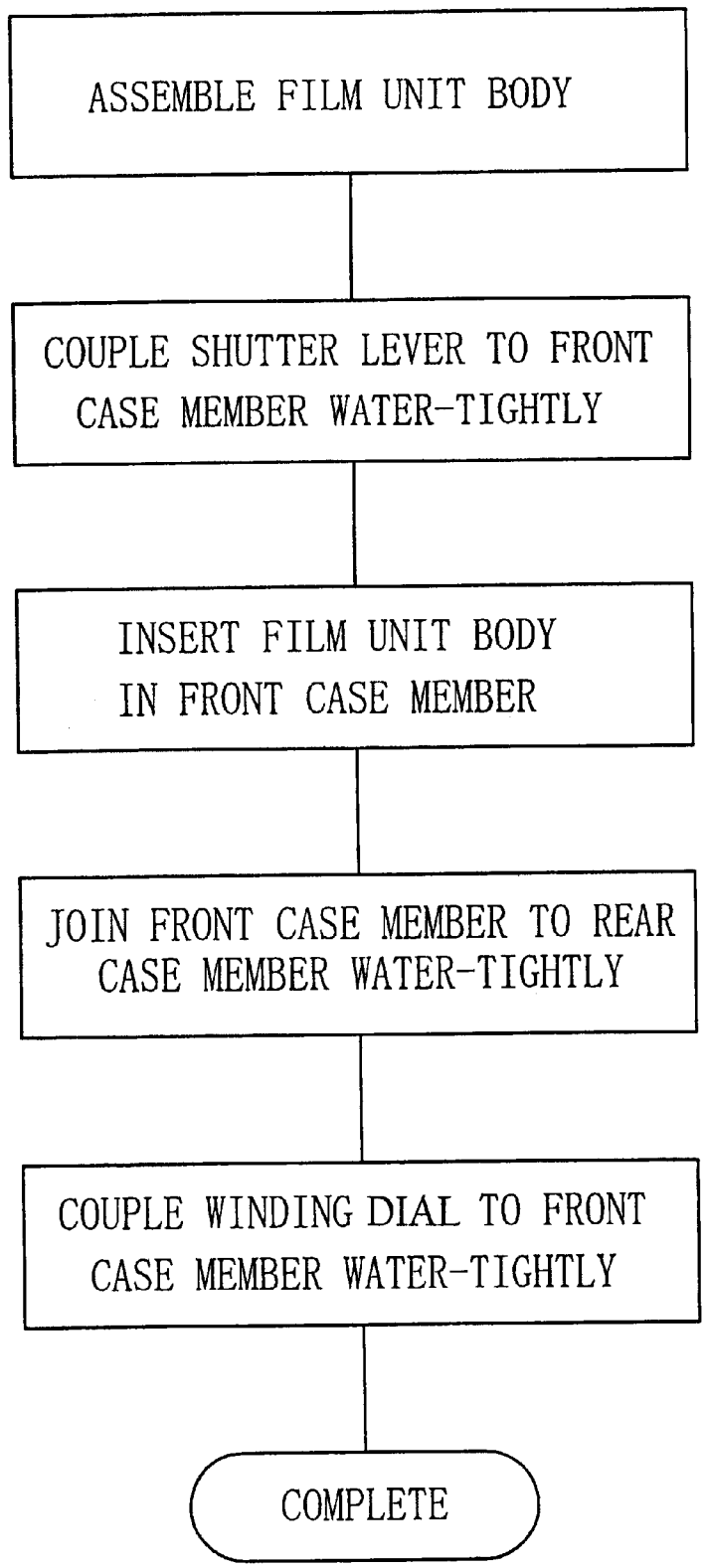
FIG. 13 is a flow chart illustrating an example of assembling method for a waterproof lens-fitted photo film unit, according to the present invention.

As shown in FIG. 13, according to an assembling method of the waterproof lens-fitted photo film unit of the present invention, the film unit body 3 is assembled first. As for the flash type lens-fitted photo film unit, the exposure unit 26, the flash unit 27 and the winding knob 33 are mounted onto the body base portion 24, and are covered with the front cover 28. Thereafter the body base portion 24 is loaded with the photo filmstrip 20 and the cartridge shell 21, and is closed by the rear cover 29. Concerning the non-flash type waterproof lens-fitted photo film unit of the present invention, the film unit body 3 is assembled in the same way except but the flash unit is not mounted. On the other hand, for assembling the waterproof case 4 that uses the waterproof cover 4c, first the waterproof cover 4c is fitted from the front side onto the front case member 4a, and then the shutter operation members, including the shutter lever 5, are mounted to the front case member 4a in a watertight fashion. Thereafter the film unit body 3 is put in the front case member 4a, and then the rear case member 4b is joined to the front case member 4a in a watertight fashion. By mounting the winding dial 6 to the waterproof case 4, the waterproof lens-fitted photo film unit is completed.

Since the winding dial 6 is mounted last, the hole 49 of the boss 48 for the winding dial 6 provides a way of escape for the air on joining the case members 4a and 4b to each other, so the air inside the waterproof case 4 is not compressed, and thus the internal air pressure is not raised. Accordingly, the case members 4a and 4b may be securely joined to each other. Also the engaging arms 52 are prevented from being disengaged from the engaging hook, or broken because of the increased internal air pressure. Indeed the interior of the waterproof case 4 is completely sealed off the water by attaching the winding dial 6 to the front case member 4a, but the air pressure inside the waterproof case 4 is not raised by the attachment of the winding dial 6, because the shaft of the winding dial 6 is just partly inserted into the front case member 4a at that time.

The operation member that is mounted after the case members 4a and 4b are coupled to each other is not limited to the above described winding dial 6, but may be a shutter operation member, a flash charge operation member, a zoom lens operation member, or the like, if it is structurally possible. Furthermore, instead of the above described type of waterproof case that covers the film unit body from the front and rear sides, other types may be used. For example, a type that covers the film unit body from top and bottom sides may be used. Thus, the shape of the waterproof case is not limitative of the present invention.

Figure 14:
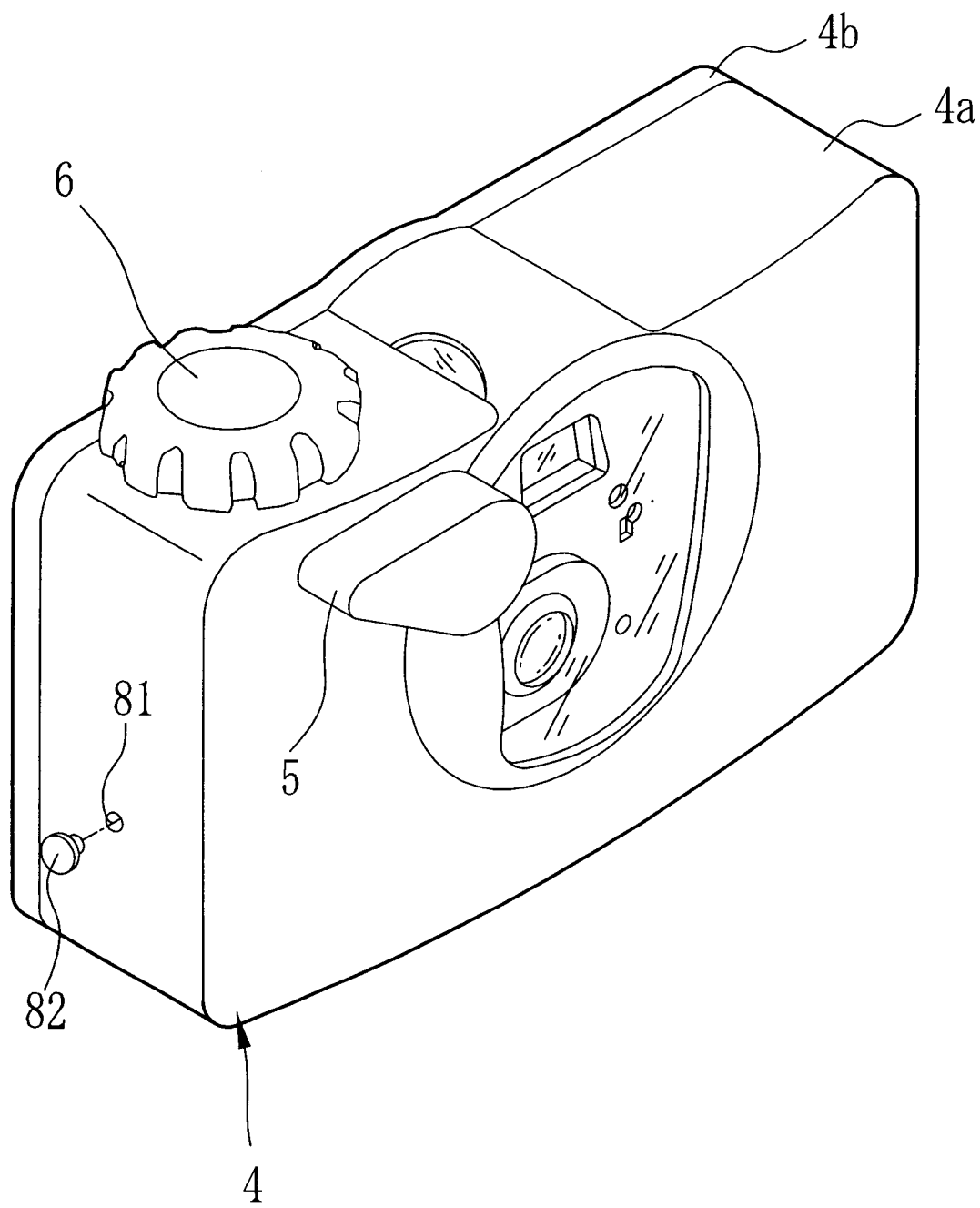
FIG. 14 is a perspective view of a waterproof lens-fitted photo film unit according to another embodiment of the present invention, that may be assembled in a watertight fashion without increasing air pressure inside its waterproof case.

According to another embodiment of the present invention, for the sake of preventing increase in the internal air pressure at the time of joining case members of a waterproof case, the case member is provided with a pressure regulating device. For example, as shown in FIG. 14, a small air escape hole 81 is provided in a side wall of a waterproof case 4. Thereby, the air is ejected through the small hole 81 even though operation members, such as a winding dial 6 and a shutter lever 5, are mounted to a front case member 4a in a watertight fashion before the front case member 4a is joined to a rear case member 4b in a watertight fashion. Therefore, the air pressure inside the waterproof case 4 is maintained equal to the atmospheric air pressure, so it would not happens that a strong force is applied to the joints between the front and rear case members 4a and 4b and breaks the joints. Also defective joint between the front and rear case members 4a and 4b is prevented. The small hole 81 is plugged up by a plug 82 after the case members 4a and 4b are joined to each other. Then, the interior of the waterproof case 4 is kept completely watertight.

As another example of pressure regulating device for preventing increase in the internal air pressure at the time of joining the case members, a pressure regulating valve may be used, that allows the air to get out of the case members but hinders entrance of water from outside into inside the case members, besides the above small hole and the plug or a cap for closing the hole.

Next, a waterproof lens-fitted photo film unit 90 that prevents reverse rotation of a winding dial 6 will be described with reference to FIGS. 15 to 21. Also in this embodiment, like elements are designated by the same reference numbers as the above embodiments, and detailed description of these elements is omitted. The following description relates only to those elements which are essential to the features of the present embodiment.

Figure 15:
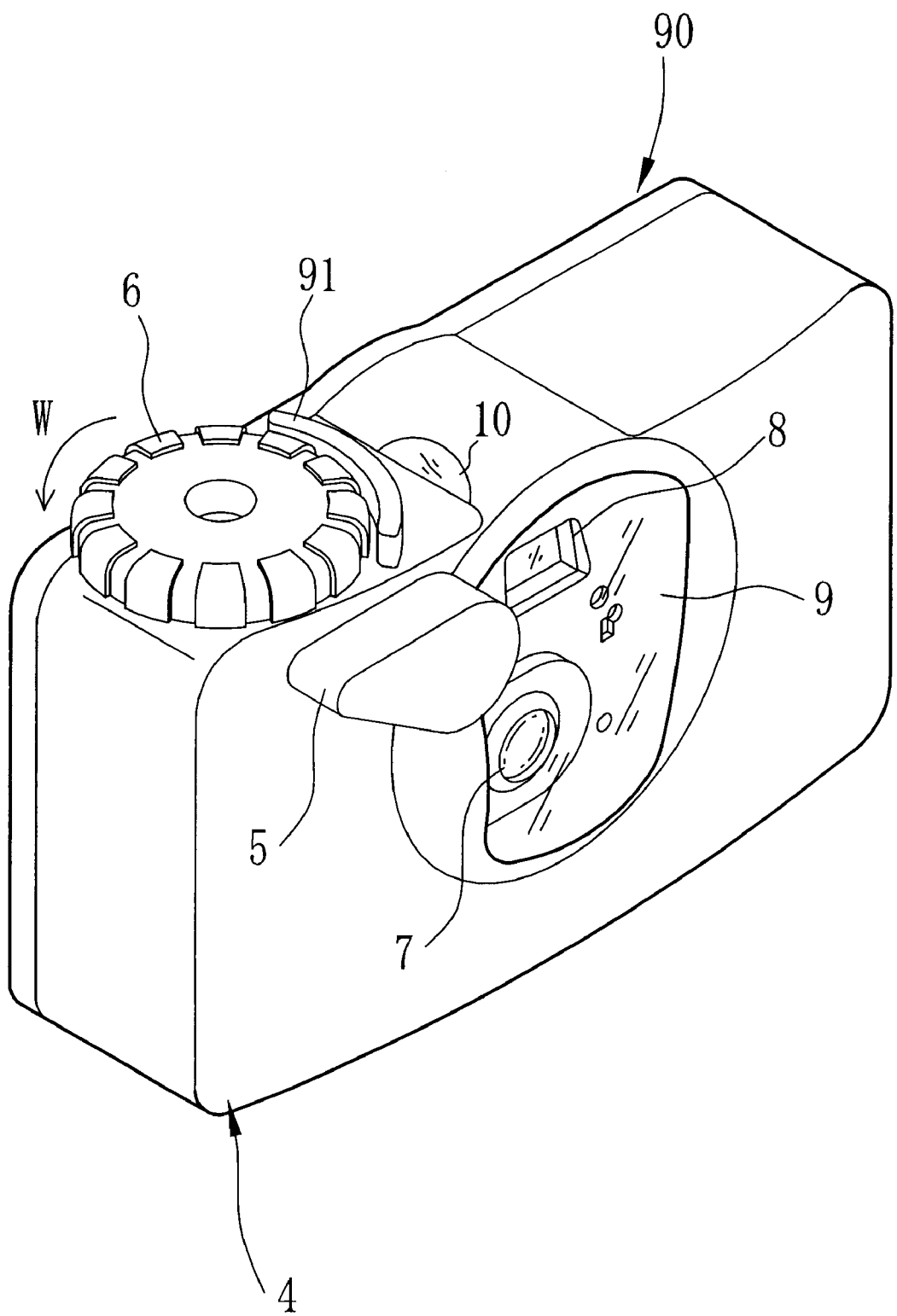
FIG. 15 is a perspective view of a waterproof lens-fitted photo film unit according to a further embodiment of the present invention, that contributes to operating a winding dial properly.

As shown in FIG. 15, a protection wall 91 is provided on a top side of a waterproof case 4 so as to surround a fragment of outer periphery of the winding dial 6. The winding dial 6 is to be rotated in a film winding direction W by a thumb or finger that is put on the winding dial 6 from a rear side of the waterproof case 4, whereas the protection wall 91 is located on opposite side of the winding dial 6 to the winding direction, as viewed from the rear side of the waterproof case 4. Accordingly, even if the winding dial 6 is being rotated in a reverse direction to the film winding direction by the thumb or finger that is put on the winding dial 6 from the rear side of the waterproof case 4, the thumb or finger would be hindered by the protection wall 91. Therefore, it is hard to rotate the winding dial 6 in the reverse direction. Beside that, because the protection wall 91 makes it uneasy to grip the winding dial 6 from the top side, the protecting wall 91 has an effect of preventing the winding dial 6 from being rotated with an unnecessarily strong force.

Figure 16:
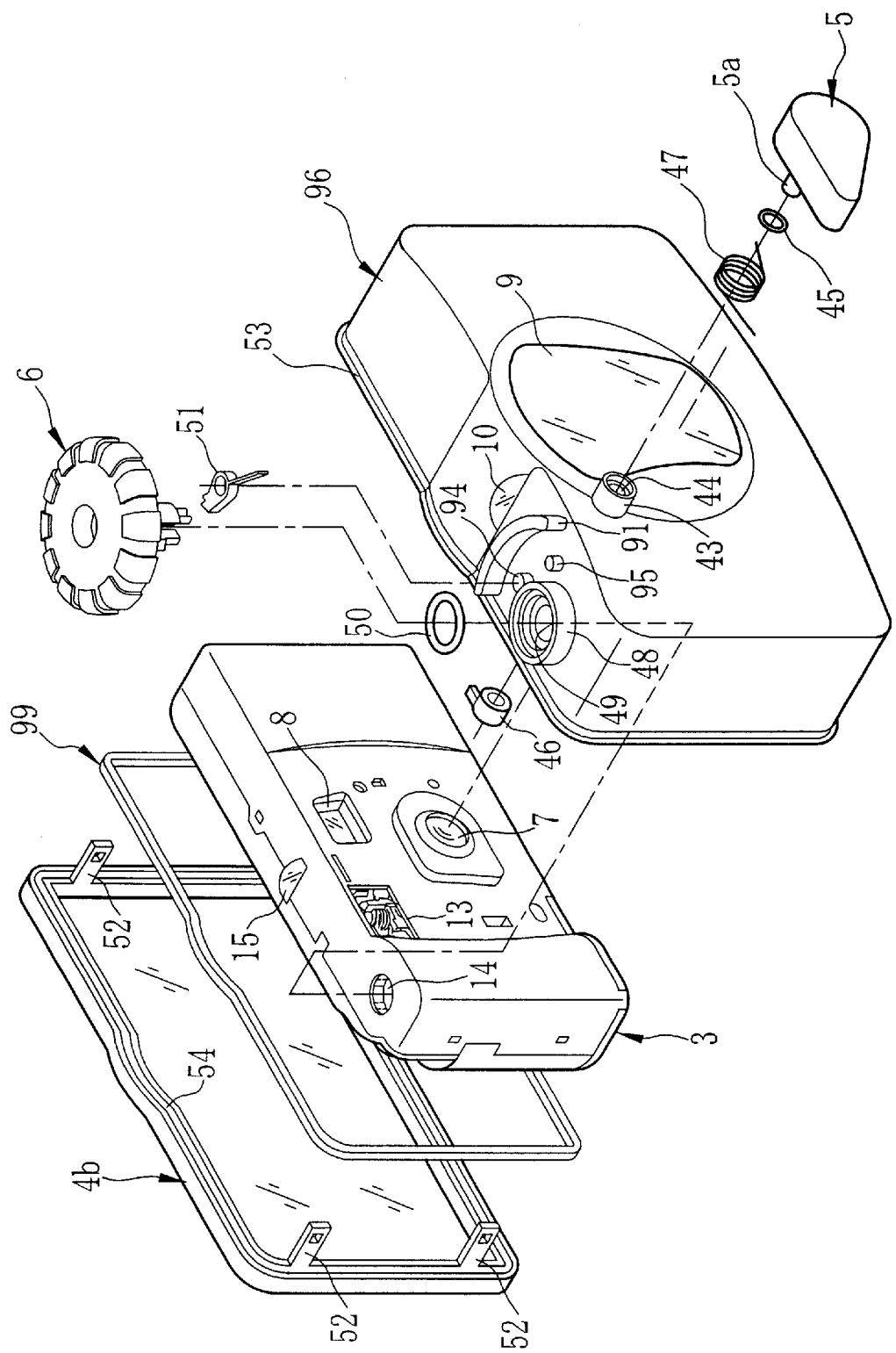
FIG. 16 is an exploded perspective view of a waterproof case of the waterproof lens-fitted photo film unit of FIG. 15.
Figure 17:
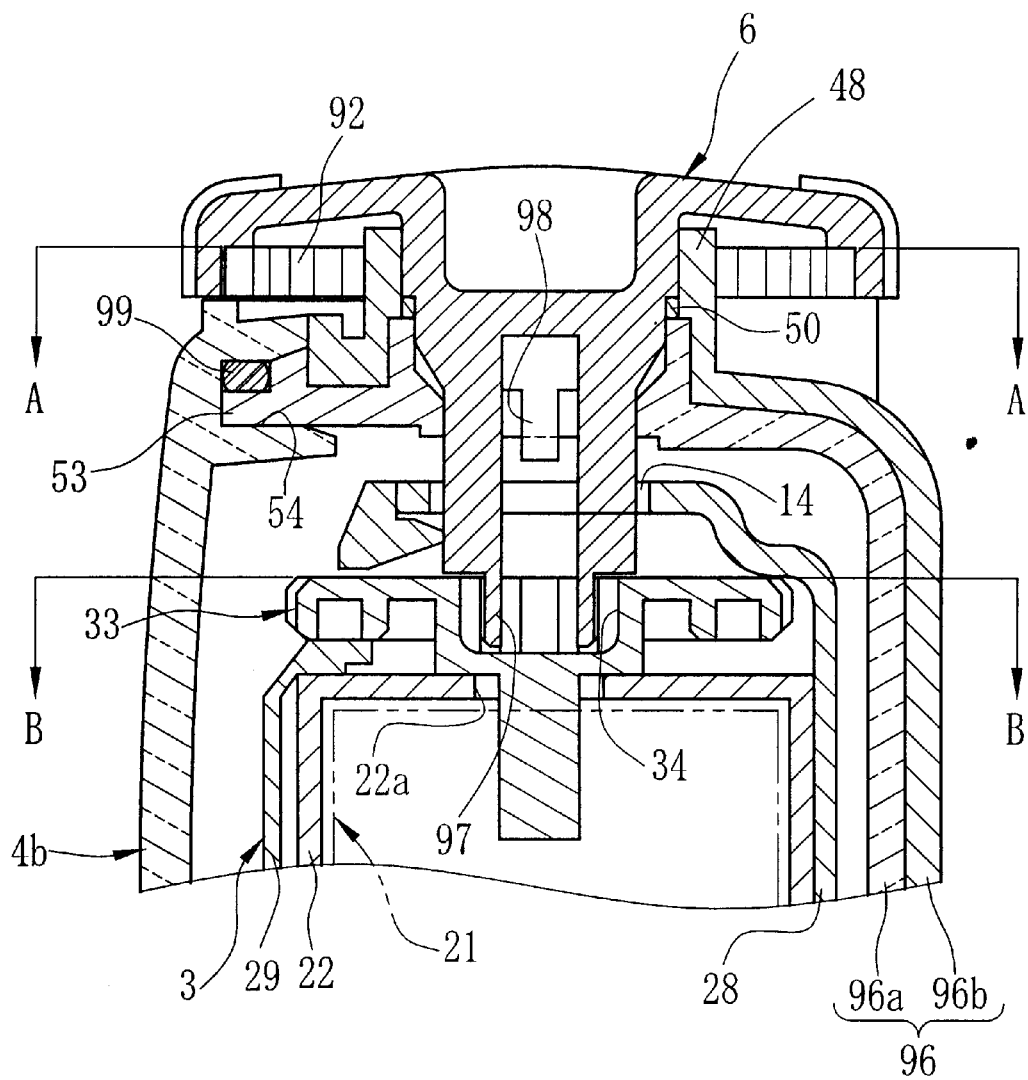
FIG. 17 is a vertical sectional view illustrating a film winding mechanism of the waterproof lens-fitted photo film unit of FIG. 15.
Figure 18:
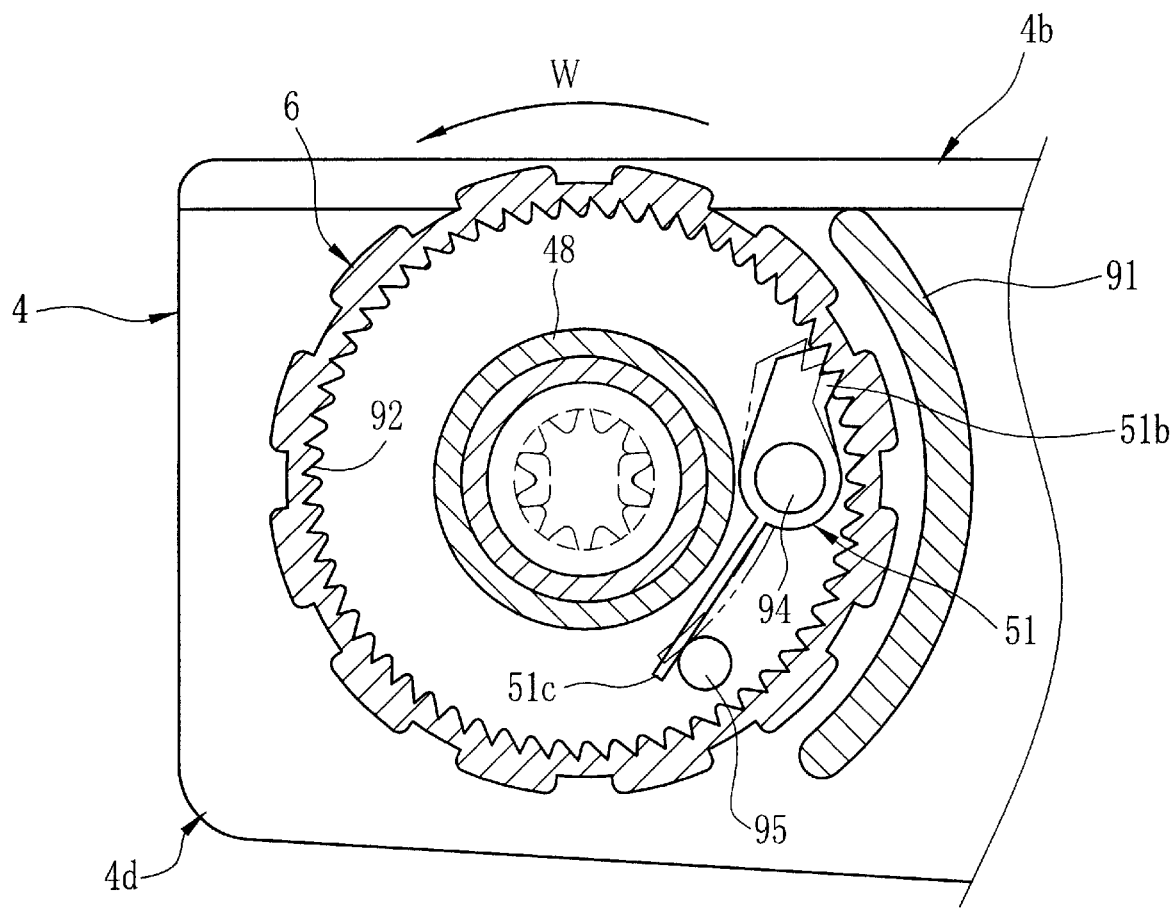
FIG. 18 is a sectional view taken along a line A—A of FIG. 17.

As shown in FIGS. 16 and 17, the winding dial 6 is an integral part consisting of a saucer-like operating portion 6a with knurls around its outer periphery, a drive shaft 6b protruding downward from a rotary center of the operating portion 6a, and a ratchet gear 92 formed around an inner periphery of the rim of the operating portion 6a. A rotary axle 94 is provided to protrude in the vicinity of a boss 48, and an anti-reverse lever 51 for preventing reverse rotation of the winding dial 6 is pivotally mounted on the rotary axle 94. Referring to FIG. 18 showing a section taken along a line A—A of FIG. 17, the anti-reverse lever 51 is formed as an integral part from an elastic plastic material, and has a claw portion 51b at an end that is on one side of a hole 51a into which the rotary axle 94 is inserted. The claw portion 51b is engaged with the ratchet gear 92. On the other end of the anti-reverse lever 51 is formed a resilient strip 51c. The resilient strip 51c is in contact with a pin 95 that is provided near the rotary axle 94, to urge the claw portion 51b to come into contact with the ratchet gear 92. The ratchet gear 92 have teeth, of which those slopes extending along the film winding direction W are gentle, while other slopes that extend along the reverse direction are steep.

Accordingly, as the winding dial 6 is rotated in the film winding direction W, the claw portion 51b of the anti-reverse lever 51 is brought into contact with the gentle slopes of the teeth of the ratchet gear 92, so the anti-reverse lever 51 rotates as shown by phantom lines in FIG. 18 while having the resilient strip 51c bent resiliently, and thus allows the winding dial 6 to rotate in the film winding direction. On the other hand, if the winding dial 6 is being rotated in the reverse direction, the claw portion 51b of the anti-reverse lever 51 is brought into contact with the steep slope of the ratchet gear 92, stopping the anti-reverse lever 51 from rotating. Thus, the winding dial 6 is stopped from rotating reversely.

Figure 19:
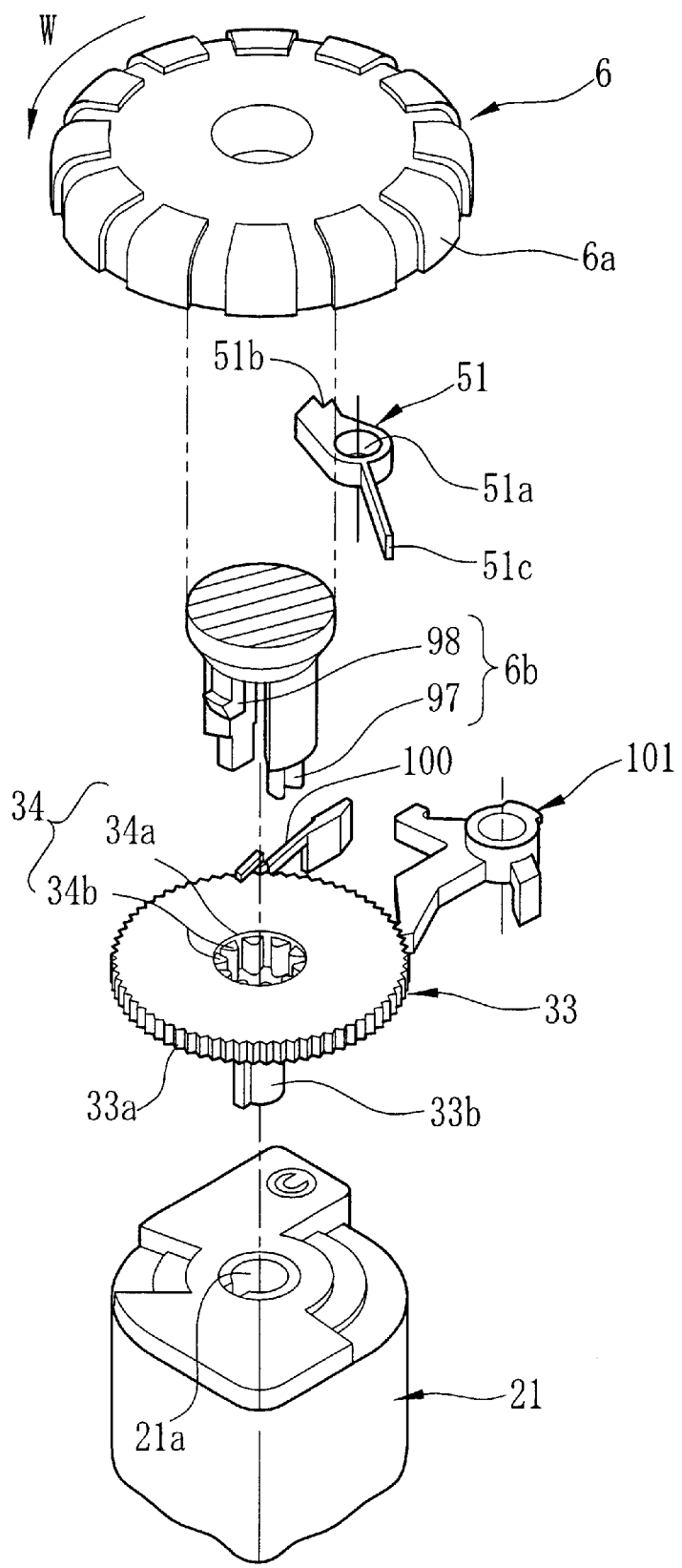
FIG. 19 is an exploded perspective view illustrating a torque limiter that is provided between a winding dial and a winding knob of the film winding mechanism of FIG. 17.
Figure 20:
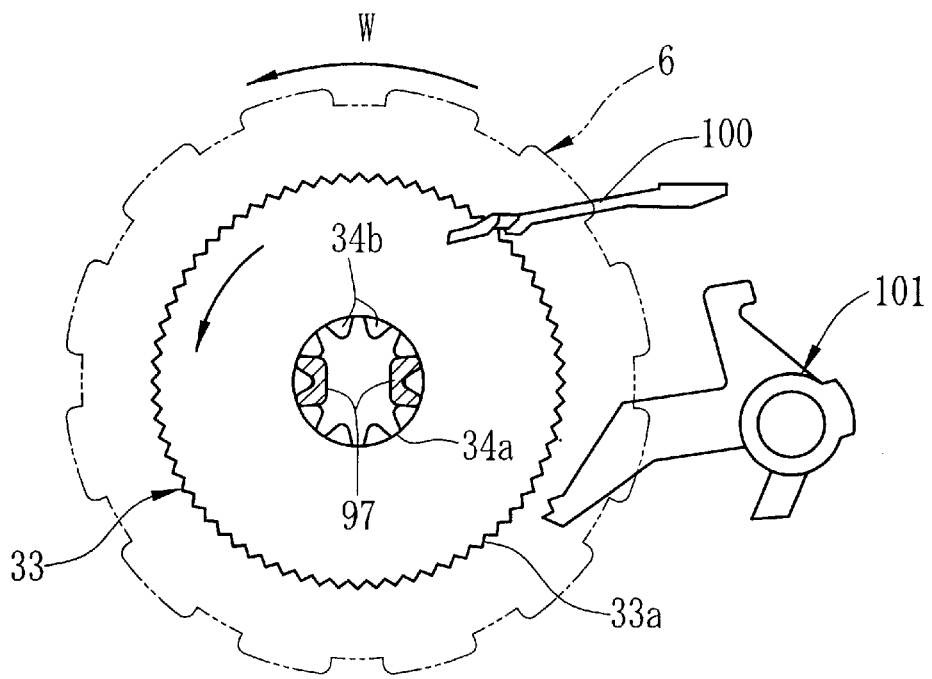
FIG. 20 is a sectional view taken along a line B—B of FIG. 17.

As shown in FIG. 19, the drive shaft 6b of the winding dial 6 has a pair of engaging legs 97 and a pair of hooks 98 formed integrally therewith such that the legs and the hooks 98 are resiliently bendable. The engaging legs 97 are engaged in an engaging hole 34 in a winding knob 33 through a hole 49 of the boss 48 and a winding dial opening 14 of a front cover 28, whereas the hooks 98 are engaged with inside of the top wall of the waterproof case 4, for stopping removal of the drive shaft 48 from the boss 48. The engaging hole 34 of the winding knob 33 has engaging protuberances 34b around its inner periphery 34a. The engaging protuberances 34b protrude radially inward, and are rotationally symmetrical about a rotary center of the winding knob 33. As shown by a section in FIG. 20 that is taken along a B—B line of FIG. 17, the engaging legs 97 has such a sectional shape that the engaging legs 97 mesh with the engaging protuberances 34b when inserted in the engaging hole 34 of the winding knob 33 that is mounted on a film unit body. Accordingly, as the winding dial 6 is rotated in the film winding direction W, the winding knob 33 is rotated in the same direction. Because an engaging shaft 33b of the winding knob 33 is engaged with a spool 21a of the cartridge shell 21 through a hole 22a that is formed through a top wall of the cartridge chamber 22, the spool 21a rotates together with the winding knob 33.

Figure 21:
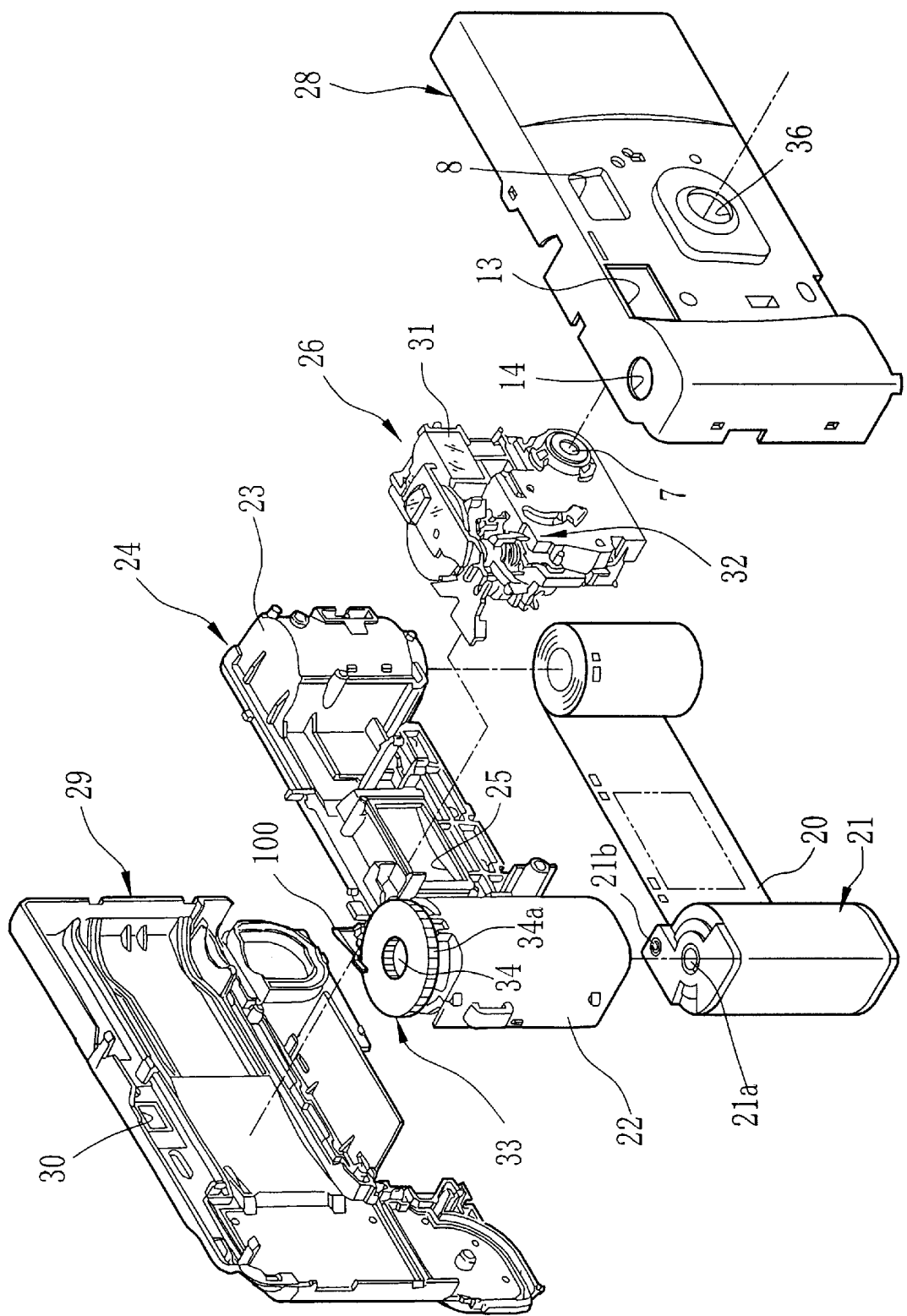
FIG. 21 is an exploded perspective view of a film unit body of the waterproof lens-fitted photo film unit of FIG. 15.

The winding knob 33 has a plurality of teeth 33a around its outer periphery, and an anti-reverse claw 100 is engaged with the teeth 33a. The anti-reverse claw 100 is a strip formed to have a resiliency, and is located on a top side of the cartridge chamber 22, as is shown in FIG. 21. When the winding knob 33 is being rotated in the reverse direction to the film winding direction W, the anti-reverse claw 100 knock against one of the teeth 33a, stopping the winding knob 33 from rotating reversely. When the winding knob 33 is rotated in the film winding direction W, the anti-reverse claw 100 is resiliently bent and clicks into engagement with the next tooth 33a.

In addition, located in the vicinity of the winding knob 33 is a stop lever 101 of a stop-winding mechanism that is mounted on an exposure unit 26. The stop lever 101 moves in cooperation with one-frame advancing of a photo filmstrip 20, from an unlock position shown in FIG. 20 to a lock position shown in FIG. 22 where the stop lever 20 is engaged with the teeth 33a of the winding knob 33 and locks the winding knob 33 from rotating. Simultaneously, in cooperation with the one-frame advancing of the photo filmstrip 20, a shutter drive lever (not shown) of a shutter mechanism 32 moves to a charged position, and is held in the charged position by the stop lever 101 that moves in the lock position. The stop lever 101 is engaged with a release lever 46 that is inserted through a shutter release opening 13 of the front cover 28 when the film unit body 3 is accommodated in the waterproof case 4. Accordingly, the stop lever 101 is rotated toward the unlock position through the release lever 46 when a shutter lever 5 is operated. Thereby, the shutter drive lever is released to cause a shutter blade to swing and, at the same time, the winding knob 33 is unlocked.

Figure 22:
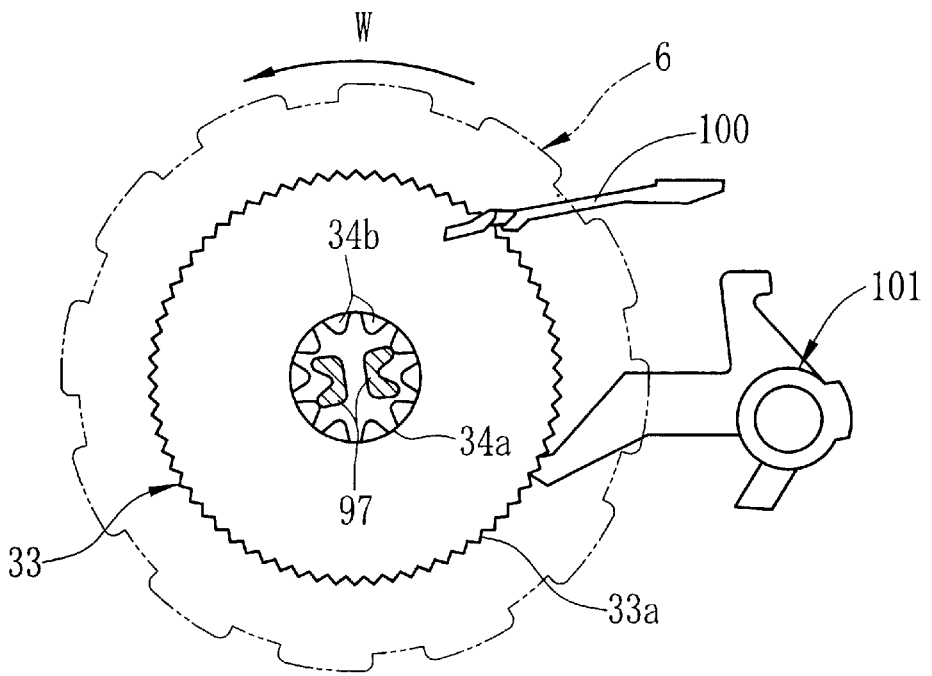
FIG. 22 is a view showing the same section as FIG. 20, for explaining the operation of the torque limiter.

The engagement between the engaging legs 97 of the winding dial 6 and the engaging protuberances 34a of the winding knob 33 is not released by a rotational torque that is applied by a rotating operation in the film winding direction W while the winding knob 33 is not locked. However, when the winding dial 6 is rotated while the winding knob 33 is locked, or when the winding dial 6 is being rotated reversely, the engaging legs 97 are resiliently bent toward the rotary center, as shown in FIG. 22, by a load applied to the winding knob 33 from the stop lever 101 or the anti-reverse claw 100. Thus, the engaging legs 97 are disengaged from the engaging protuberances 34a, so the rotational power of the winding dial 6 is not transmitted to the winding knob 33. In this way, the engaging legs 97 and the engaging protuberances 34a constitute a torque limiter. It is not necessary to use the torque limiter having the shown configuration, but other configurations are possible insofar as it has the same effect. Although the front cover 28 of the film unit body 3 is one specific to the non-flash type in the embodiment shown in FIG. 16, it is possible to use a front cover for a flash type in the way as described above. Needless to say, the anti-reverse device for the film winding operation member according the present invention is preferably applicable to a flash type waterproof lens-fitted photo film unit.

Now the operation of the above waterproof lens-fitted photo film unit 90 will be described briefly.

The user looks into a finder eyepiece window 30 through a rear case member 4b that is formed from a transparent plastic material, to check a photographic field. Thereafter when the shutter lever 5 is pushed down, the release lever 46 as attached to the shutter lever 5 rotates inside the opening 13, and actuates the stop lever 101 of the film unit body 3, thereby to cause the shutter mechanism to make a shutter release operation. As a result, the photo filmstrip 20 is exposed to a subject light that travels through a photographic window portion 9 of the waterproof case 4 and the taking lens 7, and thus a picture frame is photographed.

After the photography, the winding dial 6 is rotated in the film winding direction W to wind up the exposed portion of the photo filmstrip 20 and make shutter-charging for the next photography. At that time, if the winding dial 6 is being rotated in reverse to the film winding direction by a thumb or finger that is put on the winding dial 6 from the rear side of the waterproof case 4, the thumb or finger comes to contact with the protection wall 91, so the winding dial 6 is prevented from being rotated reversely. Also because the anti-reverse lever 51 is mounted below the winding dial 6 such that the claw member 51b of the anti-reverse lever 51 is engaged with the ratchet gear 92 as the winding dial 6 is being rotated reversely, the winding dial 6 is stopped from rotating reversely. Therefore, even while the user operates the winding dial 6 for the first time, the user would notice it if the rotational direction of the winding dial 6 is reverse.

Since the winding knob 33 is unlocked from the stop lever 101 concurrently with the shutter-releasing, the winding knob 33 rotates in the film winding direction as the winding dial 6 is rotated in the film winding direction W, because of engagement between the engaging legs 97 of the winding dial 6 and the engaging holes 34 of the winding knob 33. As being coupled to the winding knob 33, the spool 21a rotates inside the cartridge shell 21, so the exposed photo filmstrip 20 is wound up by the spool 21a into the cartridge shell 21. When the photo filmstrip 20 has been wound up by one frame, the stop lever 101 is brought into engagement with the teeth 33a of the winding knob 33, thereby locking the winding knob 33 and thus the winding dial 6.

If the winding dial 6 is rotated still in the film winding direction W after the winding knob 33 is locked by the stop lever 101, the engaging legs 97 of the winding dial 6 are resiliently bent toward each other, so the engagement between the engaging legs 97 and the engaging protuberances 34b of the engaging hole 34 of the winding knob 33 is released, and thus the winding dial 6 idles relative to the winding knob 33. Therefore, trouble of breaking the stop lever 101 or cutting the photo filmstrip 20 would not occur. Even if the winding dial 6 is forcibly rotated in the reverse direction to break the anti-reverse lever 51, the engaging legs 97 is also resiliently bent to be disengaged from the engaging protuberances 34b because of the load on the winding knob 33 given by the engagement with the anti-reverse claw 100, so the reverse rotation of the winding dial 6 is not transmitted to the winding knob 33. Therefore, the anti-reverse claw 100, the stop lever 101 or the photo filmstrip 20 would not be broken.

In this embodiment, a front case member 96 is an integral part formed by two-color molding, as shown in FIGS. 16 and 17, wherein an opaque or semi-transparent elastomer 96b is put on an obverse side of a front case main body 96a that is formed from a transparent plastic material, to cover the main body 96a except a photographic window portion 9 and a look-in window 10 for a frame counter window 15. Furthermore, in an engaging groove 54 that is formed around an outer periphery of the rear case member 4b on its front side, a rear opening brim 53 of the front case member 96 and a rubber ring 99 are fitted. The engaging groove 54 has a width that is slightly less than a total thickness of the brim 53 of the front case member 96 and the rubber ring 99, so the rubber ring 99 is compressed inside the engaging groove 54 and comes into tight contact with inner surfaces of the engaging groove 54. The rubber ring 99 thus makes sure of water-tightness between the front and rear case members 96 and 4b.

However, the present embodiment may use a waterproof case that is entirely transparent or covered with an elastomer waterproof cover, like the above embodiments. It is alternatively possible to form front and rear case members from an opaque plastic material and provide transparent sections in necessary locations. In that case, it is also possible to omit a front cover of a film unit body by providing the opaque front case member with transparent windows in place of a taking lens opening 36 and a finder objective window 8. Furthermore, instead of the above described type of waterproof case that covers the film unit body from the front and rear sides, other types, such as a type that covers the film unit body from top and bottom sides may be used. Thus, the shape of the waterproof case is not limitative of the present invention.

It is also possible to provide a ratchet gear around an outer periphery of an operating portion of a winding dial 6, and a claw member in the vicinity of the winding dial, for example, on inside of a protection wall 91, such that the claw member is engaged with the ratchet gear to prevent reverse rotation of the winding dial 6.

INDUSTRIAL APPLICATION FIELD

Although the present invention has been described so far with respect to those examples which are embodied in the waterproof lens-fitted photo film units, the present invention is not to be limited to the lens-fitted photo film unit, but also applicable to compact cameras which allow the users to reload the photo film therein. Furthermore, the present invention is not only applicable to the waterproof type, but also preferably applicable to any type of lens-fitted photo film unit or camera insofar as it is contained in a case and is operable from outside the case.

What is claimed is:

1. A waterproof camera comprising:

a camera body having an actuation member that actuates an internal mechanism when the actuation member is pressed;

a waterproof case that contains said camera body in a watertight fashion, said waterproof case being provided with an opening in a position facing said actuation member and a stepped portion around said opening on an inside wall of said waterproof case;

an operation member having a button portion exposed to outside through said opening and a mounting portion fitted on said stepped portion, said operation member being formed as an integral part from a resilient material and resiliently deformed to press said actuation member when said button portion is pushed in; and a supporting member that pushes said mounting portion against said stepped portion from inside of said waterproof case, thereby to secure said operation member, wherein said supporting member is fixed on said camera body.

2. A waterproof camera as claimed in claim 1, wherein said camera body is previously loaded with a photo filmstrip when said camera body is manufactured.

3. A waterproof camera as claimed in claim 1, wherein said actuation member is a resiliently bendable strip, and said supporting member is a rib formed on the fringe of said strip, said strip and said rib being formed integrally with an outer wall of said camera body.

4. A waterproof camera as claimed in claim 2, wherein an outer surface of said button portion is protruded out of said waterproof case, and said waterproof case has an outward protrusion formed on the edge of said opening to surround said button portion at least partly.

5. A waterproof camera comprising:

a camera body having an actuation member that actuates an internal mechanism when the actuation member is pressed;

a waterproof case that contains said camera body in a watertight fashion, said waterproof case being provided with an opening in a position facing said actuation member and a stepped portion around said opening on an inside wall of said waterproof case;

an operation member having a button portion exposed to outside through said opening and a mounting portion fitted on said stepped portion, said mounting portion having a U-shaped cross-section with an interior of the U-shaped cross-section being in direct contact with three adjacent surfaces of the stepped portion, said operation member being formed as an integral part from a resilient material and resiliently deformed to press said actuation member when said button portion is pushed in; and a supporting member that pushes said mounting portion against said stepped portion from inside of said waterproof case, thereby to secure said operation member.

* * * * *